(12) United States Patent
Ganong, III et al.

(10) Patent No.: US 8,909,526 B2
(45) Date of Patent: Dec. 9, 2014

(54) DETECTING POTENTIAL SIGNIFICANT ERRORS IN SPEECH RECOGNITION RESULTS

(75) Inventors: William F. Ganong, III, Brookline, MA (US); Raghu Vemula, Wilmington, MA (US); Robert Fleming, Lynnfield, MA (US)

(73) Assignee: Nuance Communications, Inc., Burlington, MA (US)

( * ) Notice: Subject to any disclaimer, the term of this patent is extended or adjusted under 35 U.S.C. 154(b) by 254 days.

(21) Appl. No.: 13/544,445

(22) Filed: Jul. 9, 2012

(65) Prior Publication Data
US 2014/0012582 A1    Jan. 9, 2014

(51) Int. Cl.
*G10L 15/00* (2013.01)

(52) U.S. Cl.
USPC .......................................... 704/239; 704/275

(58) Field of Classification Search
USPC ................................. 704/239, 275
See application file for complete search history.

(56) References Cited

U.S. PATENT DOCUMENTS

| | | | | |
|---|---|---|---|---|
| 5,619,708 A * | 4/1997 | Ho | ............................... | 715/224 |
| 6,738,784 B1 * | 5/2004 | Howes | .................................. | 1/1 |
| 6,813,603 B1 * | 11/2004 | Groner et al. | .................. | 704/235 |
| 6,834,264 B2 * | 12/2004 | Lucas et al. | .................... | 704/235 |
| 2003/0154085 A1 * | 8/2003 | Kelley | .......................... | 704/275 |
| 2004/0243545 A1 * | 12/2004 | Boone et al. | ....................... | 707/2 |
| 2010/0205005 A1 * | 8/2010 | Pritchett et al. | .................... | 705/3 |
| 2010/0286490 A1 * | 11/2010 | Koverzin | ...................... | 600/301 |
| 2014/0012579 A1 * | 1/2014 | Ganong et al. | ................ | 704/257 |
| 2014/0012581 A1 * | 1/2014 | Ganong et al. | ................ | 704/257 |
| 2014/0012582 A1 * | 1/2014 | Ganong et al. | ................ | 704/257 |

* cited by examiner

*Primary Examiner* — Michael N Opsasnick
(74) *Attorney, Agent, or Firm* — Wolf, Greenfield & Sacks, P.C.

(57) ABSTRACT

In some embodiments, a recognition result produced by a speech processing system based on an analysis of a speech input is evaluated for indications of potential errors. In some embodiments, sets of words/phrases that may be acoustically similar or otherwise confusable, the misrecognition of which can be significant in the domain, may be used together with a language model to evaluate a recognition result to determine whether the recognition result includes such an indication. In some embodiments, a word/phrase of a set that appears in the result is iteratively replaced with each of the other words/phrases of the set. The result of the replacement may be evaluated using a language model to determine a likelihood of the newly-created string of words appearing in a language and/or domain. The likelihood may then be evaluated to determine whether the result of the replacement is sufficiently likely for an alert to be triggered.

20 Claims, 11 Drawing Sheets

DETECTING POTENTIAL SIGNIFICANT ERRORS IN SPEECH RECOGNITION RESULTS

BACKGROUND

Automatic speech recognition (ASR) systems can be used to process input speech to yield a recognition result corresponding to the speech. The recognition result may be a text transcription of the speech. ASR systems can be used in many different contexts for processing speech regarding a variety of domains.

The recognition results of ASR systems may include misrecognition errors for any of a variety of reasons. For example, the errors may result from low-quality audio input, such as from faulty audio capture hardware, from unclear speech from a speaker, or from errors in analysis conducted by the ASR system.

SUMMARY

In one embodiment, there is provided a method of processing a top result of a recognition by an automatic speech recognition (ASR) system on a speech input. The ASR system produces a plurality of results comprising the top result and at least one alternative result of the recognition. The top result is one identified by the ASR system as most likely of the plurality of results to be a correct recognition result for the speech input. The method comprises determining whether the top result includes a member of a set of words or phrases, where the set of words or phrases comprises a plurality of members and each member of the set comprising a word or phrase. The method further comprises, when it is determined that the top result includes a word or phrase of a first member of the set, producing a modified result by substituting a word or phrase of a second member of the set for the word or phrase of the first member in the top result, determining, using a language model related to a language and/or domain of the speech input, a likelihood of the modified result occurring in the language and/or domain, evaluating the likelihood of the modified result occurring in the language and/or the domain, and determining whether to trigger an alert based on a result of the evaluating.

In another embodiment, there is provided at least one computer-readable storage medium having encoded thereon computer-executable instructions that, when executed by at least one computer, cause the at least one computer to carry out a method of processing a top result of a recognition by an automatic speech recognition (ASR) system on a speech input. The ASR system produces a plurality of results comprising the top result and at least one alternative result of the recognition. The top result is one identified by the ASR system as most likely of the plurality of results to be a correct recognition result for the speech input. The method comprises determining whether the top result includes a member of a set of words or phrases, where the set of words or phrases comprises a plurality of members and each member of the set comprising a word or phrase. The method further comprises, when it is determined that the top result includes a word or phrase of a first member of the set, producing a modified result by substituting a word or phrase of a second member of the set for the word or phrase of the first member in the top result, determining, using a language model related to a language and/or domain of the speech input, a likelihood of the modified result occurring in the language and/or domain, evaluating the likelihood of the modified result occurring in the language and/or the domain, and determining whether to trigger an alert based on a result of the evaluating.

In a further embodiment, there is provided an apparatus comprising at least one processor and at least one storage medium having encoded thereon processor-executable instructions that, when executed by the at least one processor, cause the at least one processor to carry out a method of processing a top result of a recognition by an automatic speech recognition (ASR) system on a speech input. The ASR system produces a plurality of results comprising the top result and at least one alternative result of the recognition. The top result is one identified by the ASR system as most likely of the plurality of results to be a correct recognition result for the speech input. The method comprises determining whether the top result includes a member of a set of words or phrases, where the set of words or phrases comprises a plurality of members and each member of the set comprising a word or phrase. The method further comprises, when it is determined that the top result includes a word or phrase of a first member of the set, producing a modified result by substituting a word or phrase of a second member of the set for the word or phrase of the first member in the top result, determining, using a language model related to a language and/or domain of the speech input, a likelihood of the modified result occurring in the language and/or domain, evaluating the likelihood of the modified result occurring in the language and/or the domain, and determining whether to trigger an alert based on a result of the evaluating.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
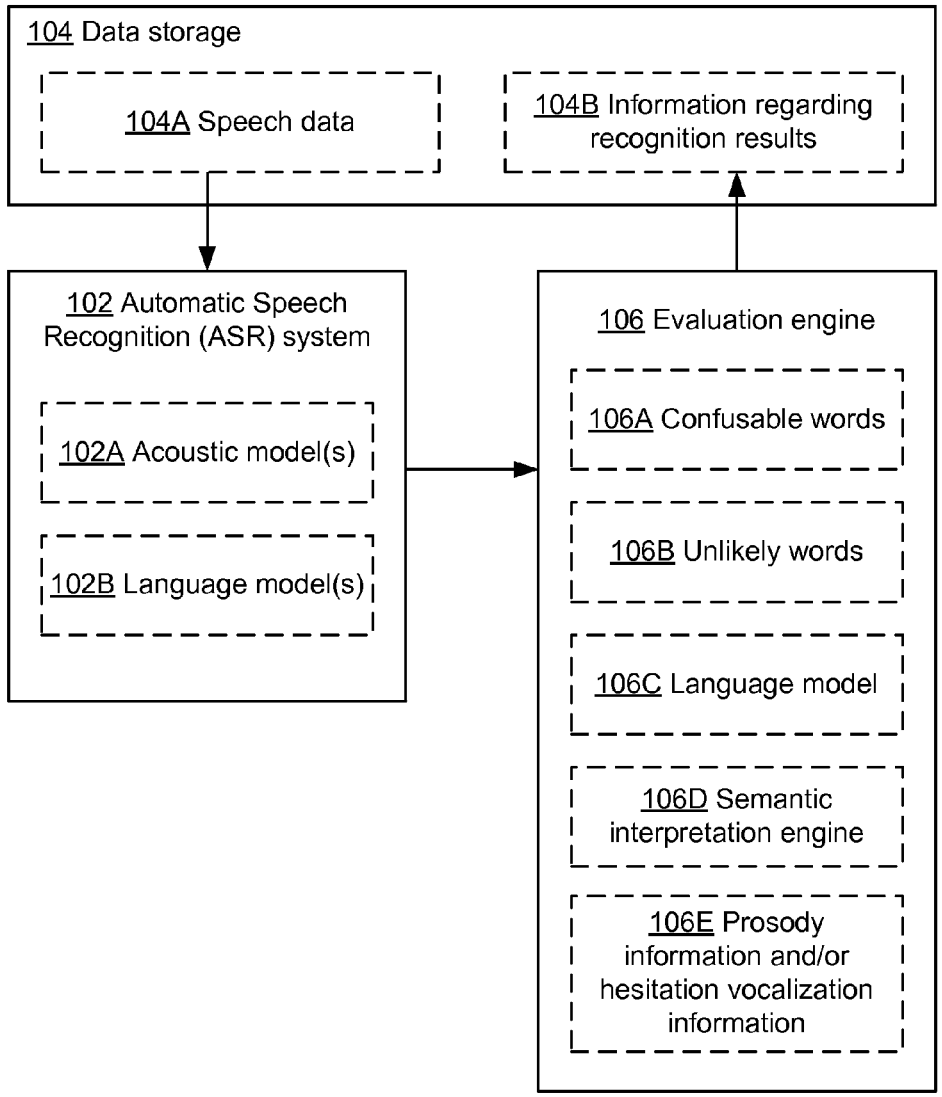
FIG. 1 is a block diagram of some components of a speech processing system with which some embodiments may act.

Correction of errors in a recognition result from an ASR system can be carried out by a reviewer of the result. The reviewer may be the speaker or any other suitable review entity (human or otherwise) that reviews the results in any of various ways, such as by viewing a textual transcription of the speech. In one review process, a human reviewer views a recognition result on a display screen while listening to audio from which the recognition result was generated, compares the audio to the recognition result, and corrects any errors found by the reviewer.

Applicants have recognized and appreciated that review processes are difficult and laborious for reviewers. It is challenging for reviewers to carefully proofread a recognition result and pick out errors in the result, particularly when there are only a small number of errors in a large recognition result or in multiple recognition results reviewed together. Review processes are therefore also not wholly reliable, as the reviewing may be subject to errors. For example, a process may be prone to human error when the speech relates to a specialized or technical topic with which a human reviewer may be unfamiliar, such that the reviewer may fail to detect some errors. As another example, errors in the recognition results may be difficult for a reviewer to detect when the errors result from the ASR system not identifying, or misidentifying, very brief audio segments, resulting in an error in the results that a reviewer may also miss. This could be the case with errors such as a recognition result including the word "typical" in place of the correct word "atypical" due to a misrecognition of the short audio segment corresponding to the "a" sound in the speech that was input to the ASR system.

Applicants have recognized and appreciated that some misrecognition errors (e.g., errors from incorrectly identifying a sound in speech input or failing to identify a sound in speech input) in a recognition result generated by an ASR system may be significant, in that the errors may have serious consequences if not identified and corrected. For example, when an ASR system is processing speech in a medical context and the recognition result corresponding to speech contains errors, the errors could have serious medical consequences. An example of a circumstance under which such a serious medical consequence may result from a misrecognition is when, for example, a clinician is dictating a result of a medical test, such as a radiological test, and an error in the recognition result changes the meaning of what the clinician said in a medically significant way. When the meaning of the recognition result changes in a medically significant way as a result of an error, the resulting medical record may be incorrect in a medically significant way, which may, for example, result in the wrong diagnosis or treatment of a patient because of the error. Such a change in the diagnosis and treatment may be problematic for the patient. For example, a patient may be treated for a disease or condition that the patient does not have or not be properly treated for a disease or condition that the patient does have.

Applicants have further recognized and appreciated that misrecognition of a speech input that results in a recognition result having a significantly different meaning than the speech input may occur as a result of an incorrect recognition of one or more words or a failure to recognize one or more words. Such errors might derive from the ASR system misrecognizing (which, as used herein, can include incorrectly recognizing and/or failing to recognize) short sounds of one or a few syllables. For example, misrecognition of a word may occur due to misrecognition of a portion of the word, such as a prefix or suffix that is only one or a few syllables. A misrecognition of a word may also occur due to the ASR system missing a word that includes only one or a few syllables. Examples of such errors in the medical context include misrecognizing "malignant" as "nonmalignant" (or vice versa), which could lead to erroneous recognition results like "the growth is malignant" when nonmalignant was spoken or "the growth is non-malignant" when malignant was spoken. Another example includes missing the word "no" in a phrase such as "there is no evidence of active disease in the abdomen," leading to the erroneous recognition result "there is evidence of active disease in the abdomen."

In many ASR systems, the recognition result returned is the "best guess" of the ASR system of text that corresponds to a speech input, and that the ASR system may have produced one or more other alternative recognition results that the ASR system identified as possibly correct. Many ASR systems operate based on probabilistic processes, such that the ASR system may produce multiple possible recognition results, each of which is associated with a probability of being a correct output. A top recognition result produced by the ASR system for the speech input may be the result that the probabilities indicate is most likely to be correct. Applicants have recognized and appreciated that when the top result of the ASR system includes the types of errors discussed above, in some cases one or more of the alternative recognition results produced by the ASR system may be more accurate in some ways and not include one or more of the errors. Continuing to use the examples above, while the top recognition result that the ASR system identified as most likely to be correct may erroneously include the word "malignant," in some cases one or more of the alternative results that were identified by the ASR system as possible (but less likely to be correct) recognition results may correctly include the word "nonmalignant."

Differences between the contents of a top recognition result and alternative recognition results of an ASR system therefore might correspond to an error in the top recognition result. When the differences correspond to the types of errors that have serious consequences, the differences may be indicative of one or more potential significant errors in the top result. Thus, for speech input in the medical domain, an evaluation of the top recognition result and the alternative recognition results may identify discrepancies between the results that result in meanings of the results being different in a medically-significant way, which may be indicative of potential medically-significant errors in the top recognition result. In other domains, an evaluation of the top recognition result and the alternative recognition results may identify results having meanings that are different in a way that is significant for the domain.

Applicants have therefore recognized and appreciated that a comparison of the top result to the alternative recognition results may aid in identifying potential errors in the top result that would have serious consequences if not identified and corrected. Applicants have also recognized and appreciated that performing such a comparison and calling the attention of the reviewer to the identified potential significant errors in the top result may aid the reviewer in carrying out a review process. In particular, identifying potential significant errors to a reviewer may help ensure that reviewers pay attention to potential significant errors in a recognition result and help ensure that the reviewers correct the errors in results of an ASR system that might otherwise have serious consequences.

In accordance with some aspects of the invention described herein, the recognition results, produced by a speech processing system (which may include two or more recognition results, including a top recognition result and one or more alternative recognition results) based on an analysis of a speech input, are evaluated for indications of potential significant errors. The indications of potential significant errors may include discrepancies between recognition results that are meaningful for a domain, such as medically-meaningful discrepancies. The evaluation of the recognition results may be carried out using any suitable criteria. In some embodiments, the criteria include one or more criteria that differ from criteria used by an ASR system in determining the top recognition result and the alternative recognition results from the speech input.

As a first example of the way in which embodiments may evaluate the recognition results, the recognition results may be evaluated to determine whether a meaning of any of the alternative recognition results differs from a meaning of the top recognition result in a manner that is significant for the domain of the speech input (e.g., the medical domain discussed above or some other domain). A significant difference in meaning between recognition results could be indicative of a potential significant error in the top recognition result.

As a second example, the recognition results could be evaluated using one or more sets of words and/or phrases, such as pairs of words/phrases. Each set of words and/or phrases may include words/phrases that are acoustically similar to one another and/or that an ASR system may confuse for one another during a speech recognition process. Further, the sets of words/phrases may include words/phrases that, when incorrectly included in a result, would change a meaning of the result in a manner that would be significant for the domain. An example of one such set of words is "malignant" and "nonmalignant," which may be confused for one another by an ASR system and that, as discussed above, could have serious consequences when misrecognized and incorrectly included in speech recognition results in a medical domain. The recognition results may be evaluated using the set(s) of words/phrases to determine, when the top result includes a word/phrase from a set of words/phrases, whether any of the alternative recognition results includes any of the other, corresponding words/phrases from the set. When the top result includes one of the words/phrases of a set and an alternative result includes one of the other words/phrases from the set, this may be indicative of a potential error in the top recognition result that may change the meaning of the result in a way that may be significant for the domain.

As a third example, such sets of words/phrases that may be acoustically similar or otherwise confusable, the misrecognition of which can be significant in the domain, may be used together with an acoustic model or a language model to evaluate a top recognition result to determine whether the top recognition result includes potential significant errors. For example, the top recognition result may be evaluated using sets of words/phrases to determine whether any of the words/phrases appear in the result. If any of a set of words/phrases appear, then it is determined whether it is likely that the word/phrase appears in error and that a correct recognition of the speech input should instead include another member of the set of words/phrases (i.e., it is determined whether it is sufficiently likely that the speech input included the other member of the set for an action to be taken). To make the determination, the word/phrase of the set that appears in the result may be iteratively replaced with each of the other words/phrases of the set. The string of words that results from each of the replacements may then be evaluated using a language model to determine a likelihood of the newly-created string of words appearing in the language and/or domain to which the language model corresponds. The likelihood produced by the language model may then be evaluated to determine whether the newly-created string of words is sufficiently likely to appear for an alert to be triggered. To determine whether the newly-created string of words is sufficiently likely, the likelihood of the newly-created string of words appearing in the language and/or domain may be compared to a threshold, compared to likelihoods of other strings of words, or otherwise evaluated. If an evaluation of the likelihood produced by the language model indicates a newly-created string of words is not sufficiently likely to appear in the language, then it may be determined that it is unlikely that the speech input includes the word/phrase that was inserted to create the string and no alert may be triggered. However, if the string of words is sufficiently likely to appear in the language (e.g., when the likelihood exceeds a threshold), then the word/phrase from the set that was inserted into the result may also be sufficiently likely to appear in the speech input at the position at which it was inserted. When the inserted word is sufficiently likely to have appeared in the speech input, this indicates that the appearance of the word/phrase from the set in the top result is a potential significant error in the top result (e.g., because the speech input may have instead included the other word from the set). The process of inserting words/phrases from the set into the top recognition result and evaluating the resulting string of words using the language model may be repeated for each word/phrase in the set. If the result of the analysis using the language model indicates that none of the strings of words including the other words/phrases from the set are sufficiently likely to have appeared in the speech input, then it may be determined that the appearance of the word/phrase of the set in the top recognition result is not a potential significant error.

In some embodiments that evaluate recognition results in accordance with this third example, the language model may provide a likelihood of the created string of words appearing in the language to which the model corresponds, with the likelihood not being edited or adjusted in any way. In other embodiments, however, the likelihood may be adjusted according to the significance of consequences that may occur in a domain if the string of words is incorrect (e.g., the significance of consequences of misrecognizing "malignant"). In some such embodiments, a likelihood of a string of words appearing may be weighted according to the significance, such that, for example, a likelihood may be higher when misrecognition would have serious consequences. In this way, if a string of words appears infrequently in the language but would have serious consequences if misrecognized, the likelihood produced by the language model may be higher, which would trigger an alert regarding the recognition results such that a reviewer could review the result more carefully and thereby prevent the serious consequences.

Using any of these evaluation techniques alone or together, or using any other suitable evaluation technique, when an evaluation of the recognition results indicates there is a potential error in the top recognition result that changes a meaning of the result in a way that is significant for the domain, the potential significant error may be identified to a reviewer during a review process so that the potential significant error can be reviewed carefully. For example, an alert could be triggered regarding the results in any suitable way, examples of which are described below. For example, when an indication of a potential significant error is detected, an alert may be triggered to notify a reviewer that a significant error might be present in the recognition result of the ASR system. When the reviewer is notified about a potential significant error, the reviewer may be more likely to closely review and, if desired, correct the potential significant error and not inadvertently overlook the error.

The three examples of evaluation techniques given above may be used together or separately to identify potential significant errors in recognition results that are a consequence of a misrecognition of speech input by an ASR system. Applicants have recognized and appreciated that the third example of an evaluation technique may also be used to detect errors that do not stem from misrecognition by an ASR system, but instead stem from mistakes made by a person providing the speech input, such as mistakes in word choice. The third exemplary evaluation technique was described above as comparing recognition results to a language model to identify when a recognition result is similar to a phrase that is sufficiently common in the language that there is a chance that the recognition result is incorrect and that the speech input instead included the similar phrase. This technique may also be able to recognize potential errors even when the recognition result is correct for the speech input, but wherein the speech input was incorrect. When a correct recognition result for an erroneous speech input is similar to another phrase in the language (which may be the phrase the speaker intended to speak) and the other phrase is sufficiently common in the language, this may trigger an alert by the evaluation engine as a potential significant error in the same manner as if the recognition result were incorrect. A reviewer may then be able to review the recognition result and the indication of the potential significant error alongside other potential significant errors. The reviewer may be able to identify from the context of the recognition result (e.g., from other speech input received together in time with the speech input and relating to the same document or topic) that the speaker misspoke and that recognition result should be corrected to include the similar word/phrase identified by the language model or another word/phrase.

Applicants have additionally recognized and appreciated that, in some cases, erroneous words/phrases that may appear in a recognition result of an ASR system may be words or phrases that are not common in the domain to which the speech input relates. A domain may be a field of use for the ASR system (e.g., a medical or clinical environment which may be general medicine or limited to a particular medical specialty, a particular business environment, or any other type of domain). A domain may have words that are often used in speech or text related to the domain and also words that are seldom used in speech or text related to the domain. Applicants have recognized and appreciated that when a word that appears in a recognition result is uncommon in the domain, this may be indicative of a potential error in the recognition result. For example, when a recognition result related to the medical domain includes a word that is not common in medicine (e.g., "pizza" in the expression "there is evidence of active pizza in the abdomen"), this may be indicative of a potential error in the recognition result. A recognition result may be evaluated based on any suitable domain or domains that are general or specific, as embodiments are not limited in this respect. For example, "medical examination" may be a domain for which recognition results are evaluated in some embodiments, and "medical examination of a female" may be a domain for which recognition results are evaluated in other embodiments. When a recognition result is evaluated for the "medical examination of a female" domain, a word that is common in the medical context but uncommon for females (e.g., prostate) may be identified as potentially erroneous when included in a recognition result.

Accordingly, in some embodiments a recognition result of an ASR system may be evaluated to determine whether the recognition result includes a word or phrase that is unlikely to occur in the domain of the speech input on which the recognition result is based. When the recognition result includes an unlikely word or phrase, any suitable action may be taken. For example, when an indication of a potential error is detected, an alert may be triggered to notify a reviewer that an error may be present in the recognition result of the ASR system. When the reviewer is notified about a potential error, the reviewer may be more likely to closely review and, if desired, correct the error and not inadvertently overlook the error. Determining whether a recognition result includes an unlikely word or phrase may be carried out in any suitable manner. For example, a set of unlikely words/phrases may be maintained for a domain and the words/phrases in the recognition result may be compared to the set to determine whether any of the words/phrases are unlikely in the domain and indicative of potential errors. As another example, a language model for the domain may be maintained that includes, for words and phrases, a value indicating a likelihood of the words or phrases appearing in speech or text related to the domain. In some embodiments, when the value of the domain language model for a word or phrase of a recognition result is below a threshold, the word or phrase may be identified as being unlikely to appear in the domain and indicative of a potential error. The domain language model may be the same language model as is used by the ASR system in generating speech recognition results or may be a different language model that is used in evaluating the recognition results of the ASR system.

Embodiments may evaluate recognition results that are formatted in any suitable manner, as embodiments are not limited in this respect. Some ASR systems may produce as output from a speech recognition process results formatted as an "N best" list of recognition results (N being two or more) that includes a top recognition result and N−1 alternative recognition results. In embodiments that operate with ASR systems that produce recognition results in an N best list format, the list of N best recognition results may be evaluated to determine whether the top recognition result includes any indications of potential significant errors. Other ASR systems may produce as output of a speech recognition process a "lattice" of words that identifies strings of words that potentially correspond to the speech input. The lattice format may include multiple nodes, where each node in the lattice corresponds to a word that potentially corresponds to sounds in the speech input, and where the nodes are interconnected in a directed manner that creates paths through the nodes, each path identifying a string of words that is a possible recognition result that corresponds to the speech input. In cases where the recognition results represented by a lattice all include the same word corresponding to the same sounds of the speech input, the paths through the lattice will all pass through the node corresponding to that word. In cases where the recognition results represented by a lattice include different words corresponding to the same sounds of the speech input, the paths through the lattice will pass through different nodes corresponding to the different words at the point in the recognition results where the results differ as to which word corresponds to the same sounds of the speech input. In embodiments that operate with ASR systems that produce recognition results in a lattice format, an evaluation of the recognition results may be performed directly on the lattice or may be carried out on an N best list of recognition results produced by processing the paths through the lattice to create each of the recognition results represented by the lattice. Other ASR systems may produce recognition results in other formats, and recognition results may be processed in these other formats, as embodiments are not limited to processing recognition results in any particular format. Accordingly, while in various illustrative embodiments described below recognition results are described as being in an N best list format, it should be appreciated that this is not illustrative and that embodiments are not limited to operating with results in an N best list format.

Described below are various examples of ways in which the aspects of the present invention described herein may be implemented. However, it should be appreciated that aspects of the invention described herein are not limited to the illustrative examples discussed below, as they may be implemented in any suitable manner.

FIG. 1 illustrates one embodiment of a speech processing system 100 that may implement some aspects of the invention described herein. The speech processing system 100 may include many different components, some of which are shown in FIG. 1.

The speech processing system 100 of FIG. 1 includes an automatic speech recognition (ASR) system 102 to carry out a speech recognition process on speech data 104A received from the data storage 104 to determine one or more recognition results for the speech data. After the recognition results are produced by the ASR system 102, the recognition results may be analyzed by an evaluation engine 106 to determine whether the recognition results include any indications of potential errors. FIG. 1 illustrates the ASR system 102 directly communicating with the evaluation engine 106, but in some embodiments the ASR system 102 may output the recognition results to another component (e.g., the data storage 104) and the evaluation engine 106 may receive or retrieve the results from the other component. The evaluation engine 106 may use a set of confusable words and/or phrases 106A, a set of unlikely words 106B, a language model 106C, a semantic interpretation engine 106D, and/or prosody and/or hesitation vocalization information 106E (all described in detail below) in performing the evaluation, or may use any combination of two or more of these. Following evaluation by the evaluation engine 106, the recognition results, along with any information created by the evaluation engine 106 regarding the results, may be stored in the data storage 104 as information 104B regarding the recognition results. The information 104B may then be used in any suitable manner, examples of which are discussed below. For example, the information may be used to display one or more of the recognition results to a reviewer during a review process that identifies potential significant errors in the results that were identified by the evaluation engine 106.

The components of the system 100 may be implemented in any suitable manner to carry out the techniques described herein. For example, the components of the speech processing system 100 may, in some embodiments, be implemented on one computing device, which may be any suitable computing device, as embodiments are not limited to operating with any particular computing devices. For example, the computing device may be a laptop or desktop personal computer, a personal digital assistant (PDA) or mobile phone, a server or any other computing device. In other embodiments, the components of speech processing system 100 may be distributed among any number of multiple computing devices that may be interconnected in any suitable manner. For example, some functionality of the ASR system 102 may be implemented on a user-interactive computing device and other functionality of the ASR system 102 may be implemented on another computing device (e.g., a server) remote from the user-interactive device. Some interconnections between computing devices may include a wired or wireless computer communication network such as a local area network, an enterprise network, or the Internet. When the components are implemented on multiple computing devices, the components may be distributed between computing devices in any suitable manner, one non-limiting example of which includes client-server models that place some components on user-interactive devices and other components on servers located remotely from the user-interactive devices.

The ASR system 102 may be one or more systems that apply any suitable ASR technique(s) to speech input to perform a speech recognition on the speech input, as embodiments are not limited to implementing any particular ASR techniques. In the embodiment of FIG. 1, the ASR system 102 processes speech input using one or more acoustic models 102A and one or more language models 102B that the ASR system 102 uses in a probabilistic process to determine one or more recognition results that may correspond to the speech input. Each of the recognition results produced by the ASR system 102 using the acoustic models 102A and language models 102B may be associated with a confidence value indicating a confidence of the ASR system 102 that the result is correct. The confidence value may be derived from probabilities determined through the application of the models 102A, 102B to the speech input during the speech recognition process. For example, in some probabilistic processes, the acoustic model(s) 102A may be used to identify a probability that a sound used in the speech input is a particular phone or phoneme of a language and to identify potential strings of words that correspond to the phones/phonemes, and the language model(s) 102B may be used to determine, based on how words or phrases are commonly used and arranged in the language in general, or in a particular domain, a probability that each of the strings of words might correspond to the speech input and thereby identify the most likely strings.

Through applying the models 102A, 102B, an ASR system 102 that implements such a probabilistic process can determine a result of a speech recognition process that is a string of one or more words that might correspond to the speech input. The ASR system 102 also produces, for the result, a confidence of the ASR system 102 (which may be represented as a probability on a scale of 0 to 1, as a percentage from 0 percent to 100 percent, or in any other way) that the result is a correct representation of the speech input. In performing such a probabilistic process, an ASR system 102 may yield multiple recognition results, each of which includes a string of words and a confidence value. When an ASR system 102 produces multiple recognition results, the ASR system 102 might order and filter the results in some way so as to output N results as the results of the speech recognition process, where N is an integer of two or more. For example, the ASR system 102 might order the recognition results according to the confidence of the ASR system 102 that a result is a correct representation of the content of the speech input and then select at most N results from the ordered recognition results. The N best results produced in this way may formatted as an "N best" list of recognition results, as a lattice of recognition results, or in any other suitable manner. The recognition results, however formatted, may include or represent a "top result" or "most likely result," which the ASR system 102 has identified as being most likely to be a correct representation of the content of the speech input, and N−1 alternative recognition results that the ASR system has identified as the results that are next most likely, after the top result, to be a correct representation of the speech input.

While the operations of some types of probabilistic speech recognition processes have been described, it should be appreciated that embodiments are not limited to applying any particular type or types of speech recognition processes.

To perform a speech recognition process on a speech input, the ASR system 102 may receive data regarding the speech input in any suitable manner. In the example of FIG. 1, the ASR system 102 receives data regarding a speech input from a data storage 104. The speech data 104A received by the ASR system 102 may be any suitable data regarding speech input that may be used in a speech recognition process to produce recognition results corresponding to the speech input. For example, the speech data 104A may include or be derived from audio data that was received via audio capture hardware, such as a microphone, and/or that was processed following capture in any suitable manner, such as through a filtering process, as embodiments are not limited in this respect. The speech data 104A may include, for example, audio data for the speech input that is stored in an audio format. Additionally or alternatively, the speech data 104A may include data derived from an analysis of the audio data, such as data regarding an audio spectrum of the speech input or any other data.

The data storage 104 that stores the speech data 104A may be any suitable storage medium or collection of media (within one device, or distributed between multiple devices) that a computing device is able to read from and write to, as embodiments are not limited in this respect. Illustrative examples of storage media include random access memories (RAM), hard drives, optical disks, and virtual disks, although any other type of storage medium may be used.

It should be appreciated that while FIG. 1 illustrates the ASR system 102 processing stored speech data from the data storage 104, embodiments are not limited to processing stored speech data or speech data from any particular source. In some embodiments, for example, an ASR system may process speech data received directly from a microphone.

After the ASR system 102 carries out a speech recognition process on the speech data 104A and produces one or more recognition results, the recognition results may be provided to the evaluation engine 106. The evaluation engine 106 determines whether the recognition results include any indication(s) of one or more potential errors in the recognition results that may be semantically significant. In one embodiment, to determine whether the recognition results include indications of such potential errors, the evaluation engine 106 may evaluate the recognition results using at least one criterion that was not used by the ASR system 102 to determine the recognition results, although not all embodiments are limited in this respect. As discussed above, the ASR system 102 may use various criteria to determine multiple recognition results, order the recognition results according to a confidence of the ASR system 102 that each result is correct, and filter the recognition results to determine the N best recognition results. The evaluation engine 106 may evaluate the recognition results output by the ASR system 102 according to any one or more criteria, and in one embodiment the criteria include at least one criterion that was not used by the ASR system 102 in determining the N best recognition results. The evaluation engine may use the one or more criteria to evaluate recognition results output by the ASR system 102 without identifying a new order of the recognition results.

The evaluation engine may operate according to any of the evaluation techniques described herein to determine whether the recognition results contain any indications of potential significant errors in the recognition results. For example, as discussed above, in some embodiments the evaluation engine 106 may compare the top result of the recognition process to one or more alternative recognition results included in the N best results output by the ASR system 102. Various examples of evaluations that may be carried out by the evaluation engine 106 are discussed below in connection with FIGS. 2-9, though it should be appreciated that the aspects of the present invention relating to performing an evaluation of the speech recognition results are not limited to implementing these exemplary processes.

As mentioned above, in some embodiments, the evaluation engine 106 may use a set of confusable words 106A, a set of unlikely words 106B, a language model 106C, a semantic interpreter 106D, prosody and/or hesitation vocalization information 106E, or any combination of two or more of these in evaluating the recognition results. The semantic interpreter 106D may analyze recognition results provided by the evaluation engine 106 to determine meanings of the recognition results. The semantic interpretation engine 106D may be implemented in any suitable manner and may carry out any suitable semantic interpretation process. For example, some embodiments may implement a semantic interpretation process like the one described in U.S. Pat. No. 7,493,253, titled "Conceptual world representation natural language understanding system and method" and dated Feb. 17, 2009. As another example, some embodiments may implement a semantic interpretation process like the one described in "A Statistical Model for Multilingual Entity Detection and Tracking" by R. Florian et al., published in the proceedings of the 2004 Human Language Technologies and North American Association for Computational Linguistics Conference. It should be appreciated, however, that the aspects of the present invention that relate to employing a semantic interpreter are not limited to one implemented in either of these manners, as any suitable semantic interpretation process may be used.

The evaluation engine 106, upon evaluating the multiple recognition results produced by ASR system 102, may produce any suitable information when an indication of a potential significant error is identified in the recognition results. For example, the information produced by the evaluation engine 106 may trigger an alert indicating that an error might be present in the recognition results and the information may optionally also identify the potential error. In some embodiments, the information identifying that an error might be present may include information identifying a recognition result and/or a particular position, word, or phrase of a recognition result from which the potential error was identified. The evaluation engine 106 may also create information regarding the potential error identified by the evaluation engine 106, such as information identifying a difference in facts between recognition results that the evaluation engine 106 identified as indicative of a potential error.

Following the evaluation by the evaluation engine 106, one or more of the recognition results (e.g., the top result and optionally one or more of the alternative recognition results) may be output by the evaluation engine 106 and optionally stored (e.g., in the data storage 104) along with information 104B regarding the recognition results. In some embodiments, information created by the evaluation engine 106 also includes information identifying a potential error and optionally a potential correction.

The information 104B may be used in any suitable manner. In some embodiments, for example, the information 104B may be used in a review process by a reviewer (e.g., a human reviewer) that reviews the recognition results produced by speech processing system 100. The review process may be carried out for a single speech input at a time or for multiple speech inputs together. When multiple speech inputs are processed together, they may be grouped at any suitable way (e.g., they may include all speech inputs received together in a period of time, such as all speech inputs received during one dictation session, may relate to a single document or subject or by any other suitable way). During the review process, the top result of the multiple recognition results may be presented to the reviewer. The information created by the evaluation engine 106 during the evaluation of the recognition result(s) produced by ASR system 102 may be used to call the reviewer's attention to the presence of potential significant errors in the top result in any suitable way (e.g., as by annotating the top result in some manner). Illustrative review processes and ways of calling the reviewer's attention to potential significant errors are discussed in detail below. Regardless of how the review process is carried out, when the reviewer is alerted to the presence of potential significant errors in the recognition result, the reviewer may be more likely to correct an error and thereby prevent any serious consequences that might have resulted from the inclusion of the potential significant error in the recognition result (e.g., consequences of the result being incorrect in a way that is semantically meaningful for the domain).

Figure 2:
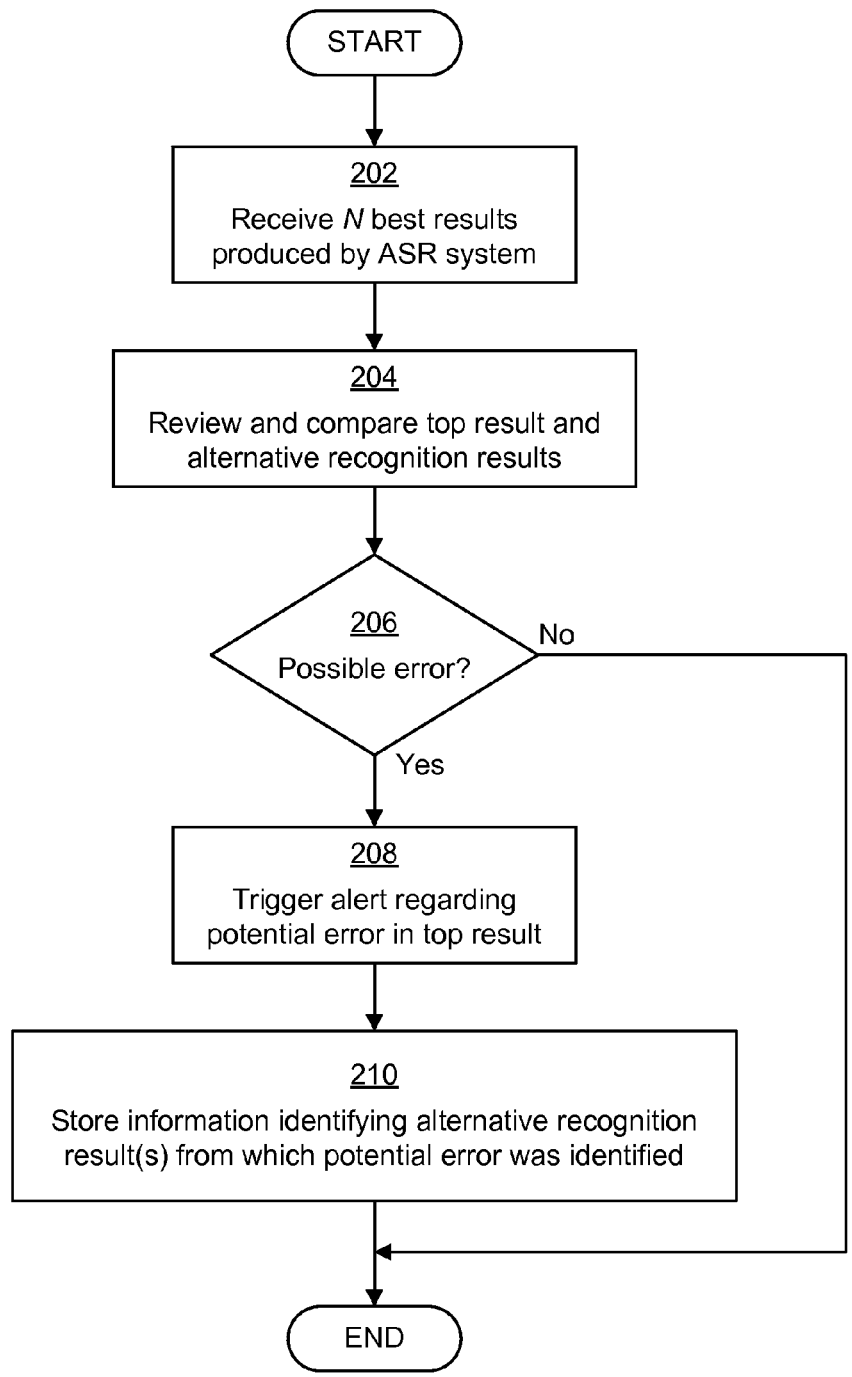
FIG. 2 is a flowchart of an exemplary process that may be carried out in some embodiments to identify potential significant errors in recognition results.

As discussed above, an evaluation engine (which may be part of a speech processing system) may carry out any suitable evaluation process to determine whether recognition results include potential significant errors. FIG. 2 illustrates one non-limiting process that may be used in some embodiments by an evaluation engine to make such a determination.

Prior to the start of the process 200 of FIG. 2, an ASR system carries out a speech recognition process on speech input and produces the N best recognition results. The N best recognition results include a top result and one or more alternative recognition results, along with an indication (e.g., a probability) for each that indicates a confidence of the ASR system that the result is correct. The process 200 begins in block 202, in which the evaluation engine receives the N best results produced by the ASR system.

In block 204, the evaluation engine reviews the N best results and compares the top result to the alternative recognition results to determine whether there are one or more discrepancies between the top result and any of the alternative recognition results that may be indicative of a potential error in the top result that is semantically meaningful in the domain. The review and comparison of block 204 may be carried out in any suitable manner, examples of which are discussed below in connection with FIGS. 3-6. For example, in some embodiments, facts determined from a semantic interpretation of the top result may be compared to facts determined from a semantic interpretation of the alternative recognition results to determine whether there are any differences in the facts that may be indicative of a potential error that is semantically meaningful in the domain. As another example, in some embodiments words included in the top result may be compared to words included in the alternative recognition result to determine whether there is a difference in the words that may be indicative of a potential error that would be semantically meaningful in the domain.

In some embodiments, one or more thresholds may be evaluated as part of the review and comparison of block 204. For example, confidences in recognition results or likelihoods determined by an ASR system using acoustic and/or language models may be compared to one or more thresholds to determine whether the confidence, likelihood, etc. is above or below the threshold. Actions may then be taken based on the comparison to the threshold, such as in the case that the evaluation engine determines whether the confidence, likelihood, etc. is sufficiently high or low (as compared to the threshold) for the action to be taken. In some embodiments in which an evaluation engine uses one or more thresholds as part of a review and comparison of recognition results, any suitable fixed or variable thresholds set to any suitable value(s) may be used, as embodiments are not limited to using any particular values for thresholds. Embodiments are not, for example, limited to using thresholds of 50% or any other number that would be used to determine whether a likelihood of something occurring indicates that thing is more likely than not to occur. It should also be appreciated that embodiments are not limited to using thresholds, and that some embodiments may perform the review and comparison of block 204 without evaluating thresholds.

Following the review and comparison of block 204, in block 206 the evaluation engine determines whether the comparison identified any indications of potential semantically meaningful errors in the recognition results. If so, then in block 208 the evaluation engine triggers an alert regarding the top result in any suitable way. For example, the alert may be triggered in block 208 by storing information indicating that a potential significant error has been detected, which may cause an alert to be raised when a review process is carried out for the recognition results. Alternatively, in some embodiments, triggering an alert in block 208 may include directly raising an alert such as by instructing that the alert be raised. An alert may be raised in any suitable way, including by presenting a visual and/or audible message via a user interface through which the recognition results are to be presented for review.

In addition to triggering an alert in block 208, when the evaluation engine determines in block 206 that the recognition results include an indication of a potential semantically meaningful error, in block 210 the evaluation engine may optionally store information regarding the potential error that may be semantically meaningful. The information identifying the potential significant error may include any suitable information. For example, storing the information identifying the alternative recognition results in block 210 may include identifying which of the alternative results prompted the identification of the potential significant error, a word or words included in the results that prompted the identification of the potential significant error, a position in a result based on which the potential significant error was identified, any combination of the foregoing information, and/or any other suitable information. It should be appreciated that in the process 200 and in other processes below that include storing information about the error, the act of storing information regarding the potential significant error is optional. In some embodiments, an alert may be triggered for the reviewer (as in block 208) without information being stored (as in block 210). Whether information on the error is stored or an alert is generated directly, in some embodiments, the reviewer may be instructed, as a result of the triggering of the alert, to review the top recognition result carefully due to the potential error, but may not be presented with information about the alternative recognition result(s) that aided in identifying the potential error.

After an alert has been triggered in block 208 and information regarding the error has been optionally stored in block 210, or if no potential errors were identified in block 206, the process 200 ends. Following the process 200, any suitable actions may be taken. Optionally, a review process may be carried out for the top recognition result. In such a review process, as a result of the alert triggered in block 208, a notification may be presented to a reviewer (e.g., a visual notification presented to a human reviewer or other type of notification) that the top recognition result may include an error that changes the meaning of the result in a way that is significant in the domain to which the recognition result relates. During the review process, information about the potential significant error may be presented to the reviewer based on the information stored in block 210. Examples of ways in which a review process can be carried out are discussed below in connection with FIG. 10.

The process 200 of FIG. 2 was described as comparing the top recognition result to all of the N−1 alternative recognition results of the recognition results to determine whether there is an indication of a potential significant error in the top result. It should be appreciated, however, that embodiments are not limited to comparing the top recognition result to all of the alternative recognition results of the N best recognition results. Rather, some embodiments (including embodiments that carry out the process of FIG. 2 or the processes of FIGS. 3-6, or similar processes) may compare the top recognition result to only some of the alternative recognition results of the N best recognition results and may not evaluate others of the alternative recognition results. Embodiments that evaluate only some of the alternative recognition results may identify the alternative recognition results to be evaluated in any suitable manner, as embodiments are not limited in this respect. Some embodiments, for example, may evaluate only a fixed number of alternative recognition results, where the fixed number is less than the number N−1 of alternative recognition results (e.g., evaluate three alternative results where the N best recognition results includes 10 alternative results). As another example, other embodiments may review confidence values provided by the ASR system for individual alternative recognition results to determine whether to evaluate an alternative recognition result. For example, an evaluation engine may compare the confidence value of the ASR system for an alternative recognition result to a threshold and evaluate the alternative recognition result only when the confidence is above the threshold. This threshold may be different (e.g., higher) than a threshold used by the ASR system in identifying the alternative recognition results to be included in the N best recognition results. As another example of a way in which the evaluation engine may review confidence values, the evaluation engine may compare confidence values within the alternative recognition results to determine whether the confidence for one or more of the alternative recognition results is much lower than the confidence value for the top recognition result or others of the alternative recognition results. A wide spread of confidence values may indicate that the ASR system has identified some of the alternative recognition results as being much less likely to be correct recognitions for speech input than other results. When there is a difference between confidence scores that exceeds a threshold difference, an evaluation engine may refrain from evaluating alternative recognition results that are much less likely to be correct by evaluating only the recognition results having the higher confidence scores separated from the other results by at least the threshold difference.

It should be appreciated that embodiments that evaluate only some of the alternative recognition results may use any suitable criterion or criteria in determining which alternative recognition results to evaluate. Embodiments are not limited to using any of the exemplary techniques described above or any other specific techniques to select results to evaluate.

As mentioned above, an evaluation engine may act in any suitable manner to review and compare recognition results. FIGS. 3-6 illustrate illustrative techniques that may be implemented by embodiments to review and evaluate recognition results. It should be appreciated, however, that the illustrative techniques described below are merely examples and that embodiments of the invention that relate to evaluating recognition results are not limited to implementing any of these techniques.

Figure 3:
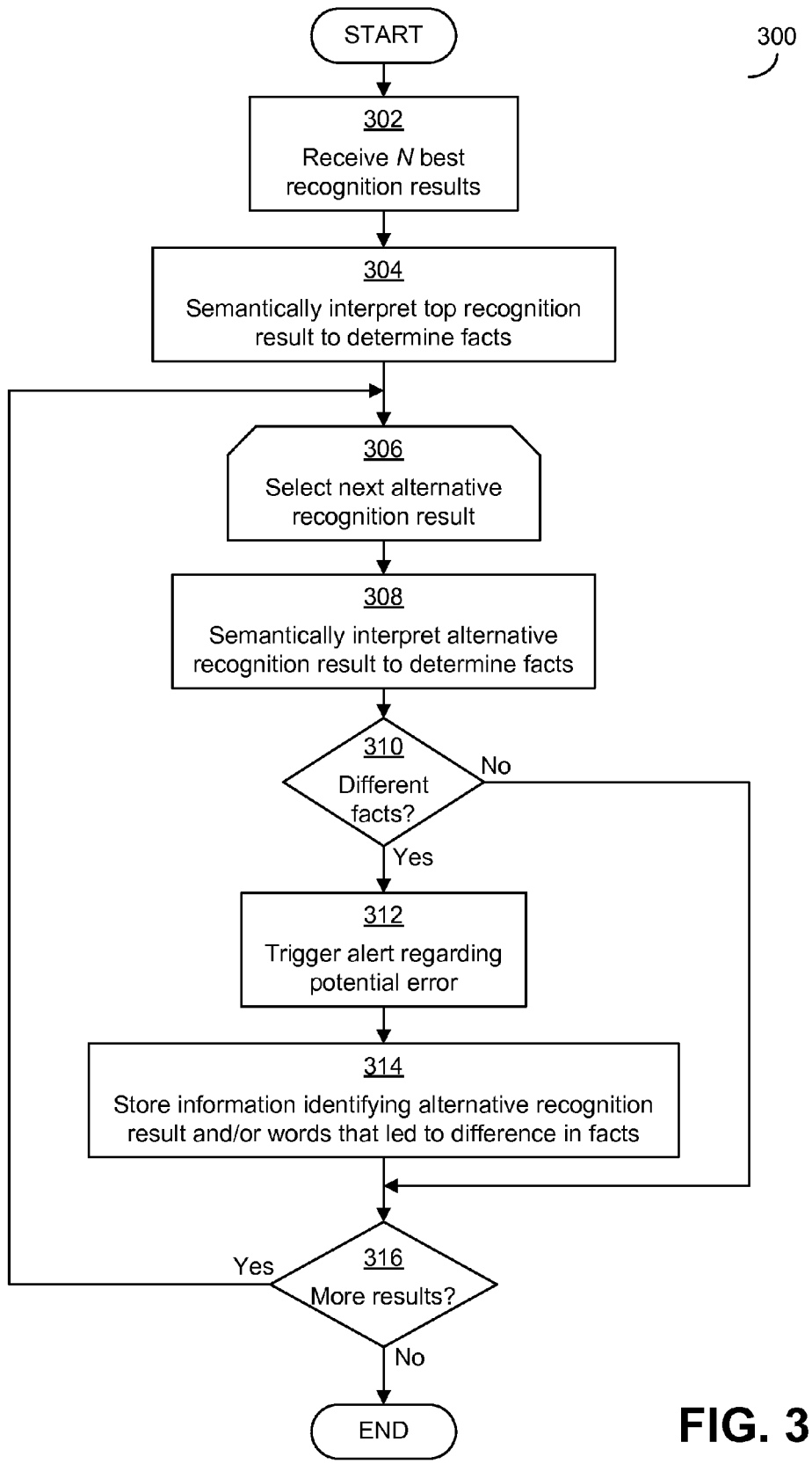
FIG. 3 is a flowchart of an exemplary process that may be carried out in some embodiments to identify potential significant errors based on a semantic interpretation of recognition results.

FIG. 3 illustrates a process that applies a semantic interpretation to review and compare recognition results to determine whether the recognition results include one or more indications of potential errors that are semantically significant in the domain. In particular, the process 300 of FIG. 3 determines, from a semantic interpretation of the recognition results, facts that are expressed in each of the recognition results and compares the facts from the top recognition result with those from other recognition results to identify whether they differ in a way that is significant for the domain. When the facts differ in a way that is significant for the domain, this may indicate that there is a potential error in the top recognition result that is significant for the domain.

As discussed above, embodiments may operate with ASR systems that produce speech recognition results in an N best list format, a lattice format, or any other suitable format. In embodiments that operate with recognition results in an N best list format, the process 300 of FIG. 3 may operate by semantically interpreting each of the recognition results in the list of N best recognition results. In some embodiment that operate with recognition results in a lattice format, an evaluation engine may first produce an N best list of recognition results by processing the lattice and the paths through the lattice to identify each of the N recognition results represented by the lattice, including a top recognition result that the lattice indicates that ASR system was most confident is a correct representation of the speech input and N−1 recognition results that the ASR system was less confident are correct representations of the speech input.

The process 300 begins in block 302, in which the evaluation engine receives the N best recognition results of a recognition process performed by an ASR system. As mentioned above, the N best recognition results include both a top recognition result and N−1 alternative recognition results. In some ASR systems, each of the recognition results is associated with a likelihood that the recognition result is a correct representation of the speech input processed by the ASR system, but the process of FIG. 3 is not limited to use with such an ASR system.

In block 304, the evaluation engine provides the top recognition result to a semantic interpretation engine to semantically interpret the top result. The semantic interpretation of block 304 identifies facts expressed in the top recognition result based on analyzing the content (e.g., words and phrases) of the recognition result and a domain to which the recognition result relates. Any suitable semantic interpretation process may be used by a semantic interpretation engine, including a generic semantic interpretation process that identifies facts expressed in a result in a manner independent of any particular domain, or a domain-specific semantic interpretation process that identifies facts relating to a particular domain. For example, in some embodiments a clinical language understanding (CLU) semantic interpretation engine may be used that is specifically designed to identify facts relating to a clinical encounter with a medical patient. Other semantic interpretation engines operating in other domains may be used in other embodiments. In some other embodiments, a semantic interpretation engine that interprets facts according to multiple different specific domains may be used, or multiple different semantic interpretation engines that each interpret facts according to a specific domain may be used together. As was mentioned above in connection with FIG. 1, any suitable semantic interpretation process may be used, as the embodiments of the invention that employ a semantic interpretation process are not limited in this respect.

After the top recognition result has been semantically interpreted in block 304, the evaluation engine begins a loop in which the evaluation engine semantically interprets each of the N−1 alternative recognition results using the same semantic interpretation engine (or engines) that was used in block 304 to interpret the top result. In block 306, the evaluation engine selects the next alternative recognition result that has not yet been interpreted. In block 308, the alternative recognition result selected in block 304 is semantically interpreted to determine facts expressed in the alternative result. The evaluation engine then compares, in block 310, the facts identified in the top result to the facts that were identified from the recognition result interpreted in block 308 to determine whether they differ in a way that is semantically meaningful. For example, if the speech input related to a clinical encounter, the semantic interpretation of the top result yields one or more facts that "the growth is malignant," and the semantic interpretation of one of the alternative recognition results yields one or more facts that "the growth is nonmalignant," the difference between "malignant" and "nonmalignant" in the facts may be indicative of a potential error in the top recognition result that is semantically meaningful, the existence of which should be identified to a reviewer.

The determination in block 310 may be made in any suitable manner. For example, in some embodiments, the evaluation engine may determine whether there is any difference between the facts identified in the alternative recognition result and the top result, without further evaluating those differences and implicitly identifying any differences in facts as generally meaningful. A difference in facts may result from the alternative result including one or more facts not included in the top result, or from the alternative result not including one or more facts included in the top result.

If the evaluation engine were to interpret any difference in facts as semantically meaningful, in some environments this may result in a large number of "false alerts" where potential errors are flagged that would not be semantically meaningful, which could reduce the usefulness of the evaluation because the reviewer may begin to discredit or not pay sufficient attention to the alerts. Therefore, in some embodiments, the difference(s) in the facts are evaluated further to determine whether they may be semantically meaningful, which may limit the types of differences that generate an alert.

In some embodiments, for example, the evaluation engine may determine whether there is a difference in "significant" facts between the alternative result and the top result. Whether there is a difference in significant facts may be determined in some embodiments by marking as significant some of the types of facts the semantic interpretation engine is configured to find in a recognition result. The semantic interpretation engine may be configured to interpret multiple different types of facts that may be expressed in a recognition result and may evaluate a recognition result to identify one or more facts that each corresponds to a fact type. A type of fact may be a semantic category or classification of a piece of information that can be expressed in a recognition result and that the semantic interpretation engine may be configured to extract from a recognition result. In some domains, some of the facts may be more meaningful than others, and thus some facts may be important or significant in the domain. In the medical domain, for example, facts relating to symptoms, diagnoses, and treatments may be significant. Therefore, in some embodiments types of facts that the semantic interpretation engine may be configured to extract from recognition results that correspond to symptoms, diagnoses, and treatments may be marked as significant. When some types of facts are identified as significant, the evaluation engine may determine whether there is any difference in significant facts (i.e., facts having a fact type marked as significant) identified in recognition results. A difference in significant facts may be detected when an alternative recognition result includes a significant fact not in the top result or when an alternative recognition results is missing a significant fact in the top result. For example, in the medical context, when a semantic interpretation of the top recognition result indicates that at least a part of the result relates to the diagnosis of "pneumonia" and a semantic interpretation of an alternative recognition result instead indicates that at least a part of the result instead relates to the diagnosis "acute pneumonia," the difference in diagnoses may be treated as a difference in significant facts.

It should be appreciated that embodiments are not limited to determining in any particular way(s) whether there is a difference in facts in the N best results, or whether any such difference is significant. Accordingly, while several examples have been given, still other processes may be used in block 310 to identify whether facts are different and optionally whether any such difference is significant, as embodiments are not limited in this respect.

If the evaluation engine determines in block 310 that there is a significant difference in facts between the top result and the alternative recognition result selected in block 306, then in block 312 the evaluation engine triggers an alert regarding a potential error in the top results, and in block 314 optionally stores information identifying the alternative recognition result that resulted in the triggering of the alert. The triggering and storing of blocks 312, 314 may be carried out in any suitable manner, including using any of the techniques described above in connection with blocks 208 and 210 in FIG. 2.

After the triggering and storing in blocks 312, 314, or if no significant difference in facts was determined in block 310, the process determines in block 316 whether there are any alternative recognition results that have not yet been semantically analyzed and compared to the top result. If so, the process returns to block 306 to select and evaluate another recognition result. If, however, the evaluation engine determines in block 316 that all alternative recognition results have been interpreted and compared to the top result, then the process 300 ends.

In some embodiments, a semantic interpretation process may be resource intensive, such as by requiring a relatively large amount of time, processor resources, and/or storage resources to complete. In some such embodiments, an evaluation engine may limit the number of recognition results that are semantically interpreted by the process 300 of FIG. 3. For example, the evaluation engine may compare a confidence of the ASR system that a result is a correct recognition of the speech input to a threshold and, if the confidence is below the threshold, refrain from semantically interpreting the result. It should be appreciated that all embodiments (as some embodiments interpret all of the N best results output by the ASR) are not limited to determining whether to semantically interpret recognition results or, when such a determination is to be made, to making the determination in any particular manner.

Figure 4:
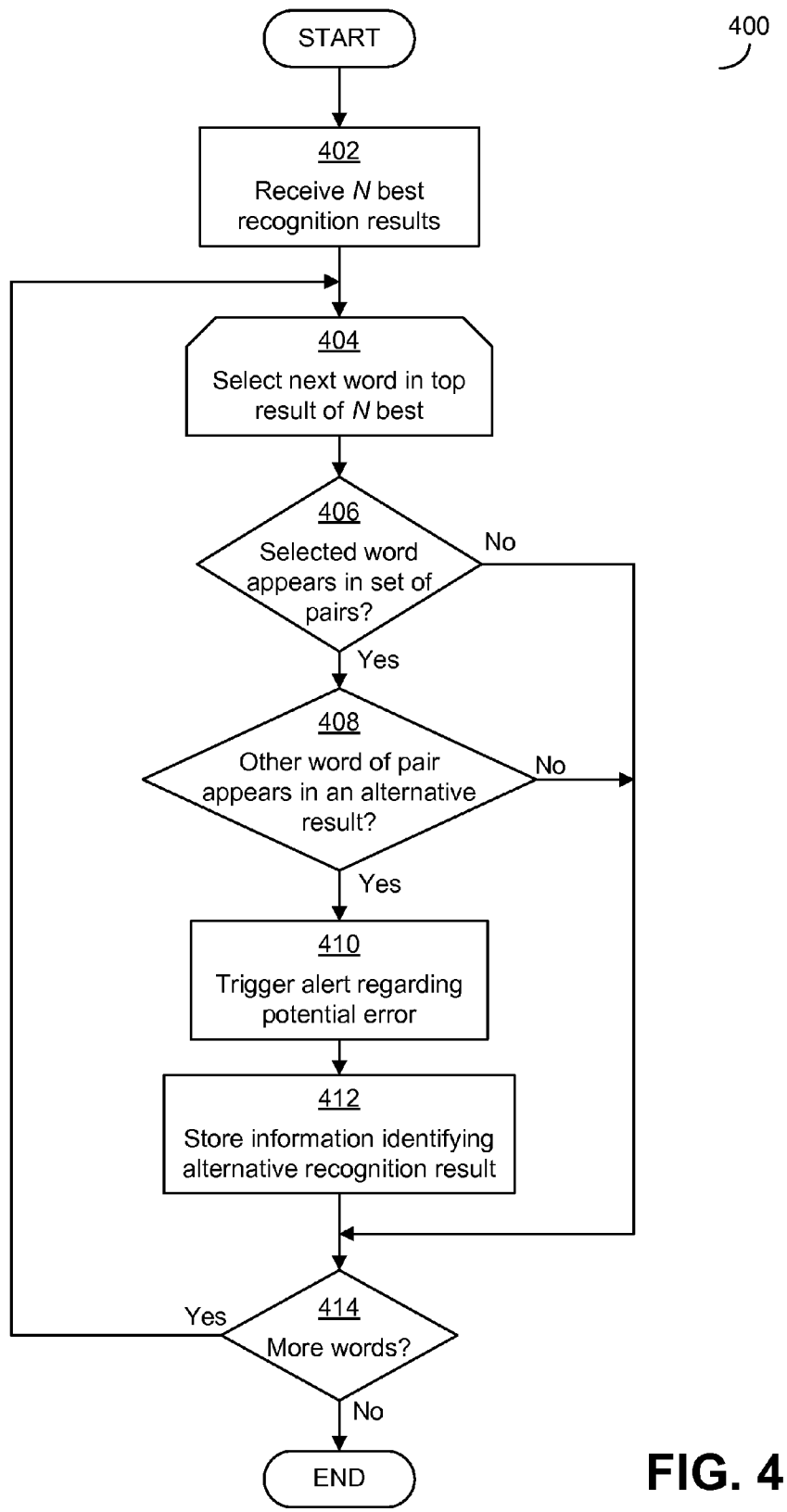
FIG. 4 is a flowchart of an exemplary process that may be carried out in some embodiments to identify potential significant errors based on whether both words of a word pair appear in recognition results.
Figure 5:
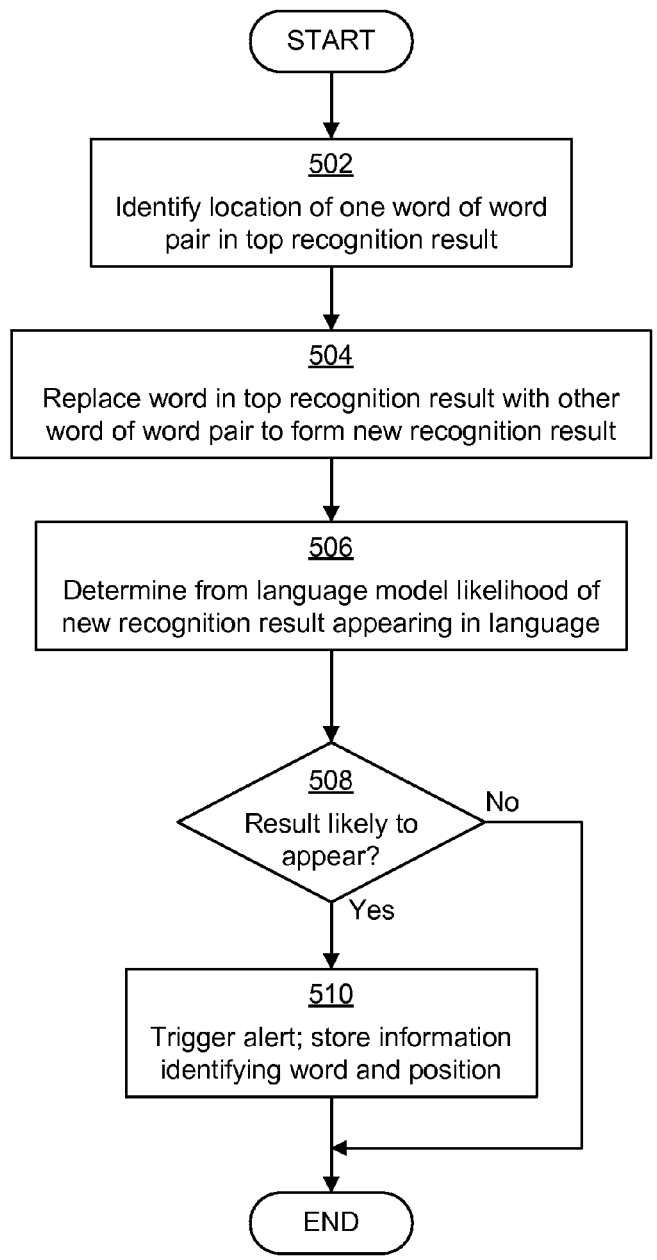
FIG. 5 is a flowchart of an exemplary process that may be carried out in some embodiments to identify potential significant errors based on whether, when a word of a word pair appears in the top recognition result, a language model indicates that the other word of the word pair was sufficiently likely to have appeared instead in the speech input.
Figure 6:
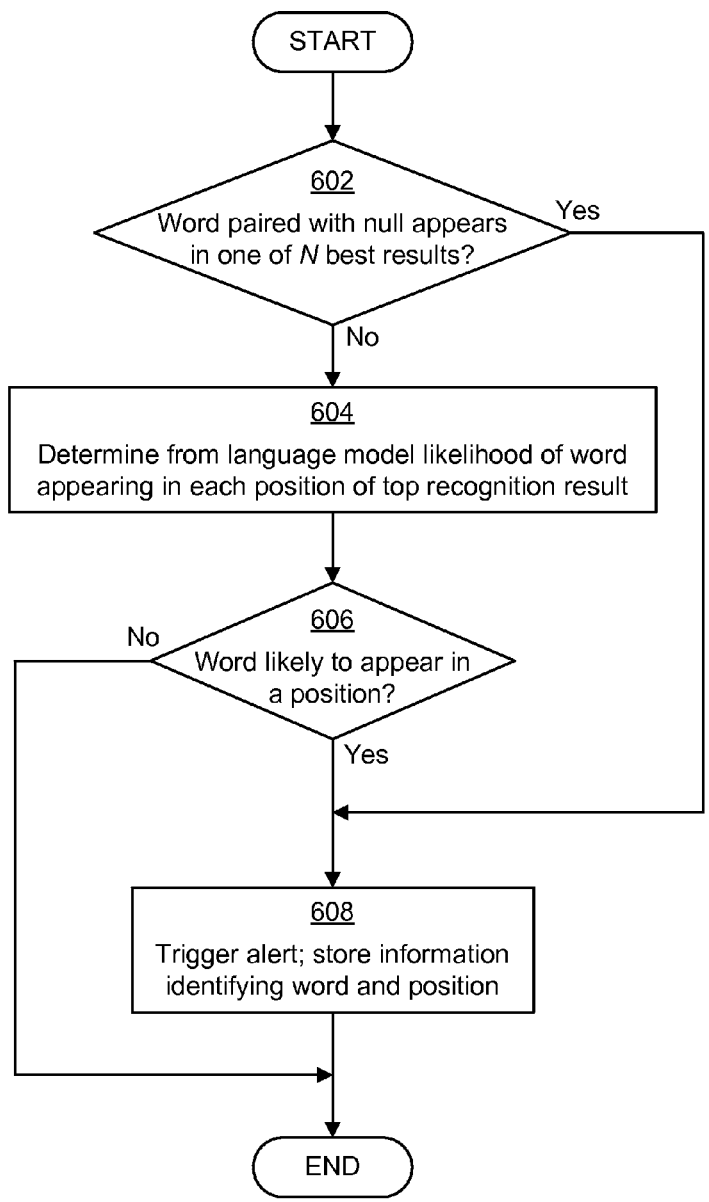
FIG. 6 is a flowchart of an exemplary process that may be carried out in some embodiments to identify potential significant errors in recognition results based at least in part on a language model and a word pair when the word pair includes a null word.

While the example of FIG. 3 identifies potential significant errors by analyzing differences in facts extracted from the top and alternative recognition results, some embodiments may not use semantic interpretation and may not compare facts expressed by the recognition results. Instead, some embodiments may directly analyze differences in words and/or phrases included in the top recognition result and alternative recognition results to determine whether any differences in the words/phrases are indicative of a potential significant error in the recognition results. FIGS. 4-6 illustrate examples of techniques that examine recognition results for differences in words and/or phrases that may be indicative of a potential significant error in the recognition results.

In embodiments that directly examine words/phrases of recognition results, an evaluation engine may determine whether a potential significant error is present in recognition results by examining one or more sets of words/phrases. The sets of words/phrases may include words/phrases that are acoustically similar and subject to being confused by an ASR system performing a speech recognition process on a speech input. Each set (e.g., a pair) of acoustically similar words/phrases may include words/phrases that include similar sounds or that differ from one another by only one or a few sounds. For example, in a medical context, the words "arterial" and "arteriosclerotic" may be confusable due to the similarity of the sounds in the first parts of the two words. Another example is "malignant" and "nonmalignant" due to the overlap of many of the sounds used in the two words. Further, a set of words/phrases may include words/phrases that, when confused by an ASR system, would change a meaning of a recognition result in a way that would be semantically significant (e.g., significant in a domain). For example, while the words "to" and "too" may be acoustically similar and confusable by an ASR system and an incorrect substitution of one for the other would be erroneous, the error may not have serious consequences in some domains if not corrected, so that these words would not be considered significant in these domains. Conversely, as discussed above, in the medical context if the word "malignant" is erroneously substituted for the word "nonmalignant" or vice versa, a patient may be improperly treated, which may have serious consequences for the patient and the medical institution. By limiting the list of pairs of words to only words that, when misrecognized, would result in serious consequences, the system may limit the number of cases in which an alert is raised and thereby focus a reviewer's attention on the errors that are most significant when present. It should be appreciated, however, that embodiments are not limited to evaluating only significant words or words associated with serious consequences, as the techniques described herein may be used to evaluate any word(s).

In some embodiments, a set of words/phrases may include a "null" word or phrase representing an absence of any word or phrase. This may be done because a short word/phrase may be acoustically similar to no sound (or no word/phrase) at all, as the short word/phrase may include only a small portion of sound, or because a short word/phrase may be acoustically similar to the other words around the short word/phrase such that an ASR system may misrecognize the short word/phrase as merely a portion of the other words. For example, a word like "no" that has only a very short sound may be acoustically confused with silence (i.e., a "null" word) and thus a speech recognition result could incorrectly include the silence (i.e., no word or phrase) in place of the word "no." As another example, the word "no" in the phrase "no pneumonia was found" may be acoustically similar to the sound of the "pneu" in the word "pneumonia" and the ASR system may incorrectly identify the sounds corresponding to the word "no" as merely a part of the sounds for the word "pneumonia" and thus a speech recognition result would incorrectly not include a word or phrase corresponding to the word "no" in the speech input. The inclusion of the null word instead of the actual word/phrase can be significant as it may result in the recognition result having an opposite or otherwise different meaning. For example, when processing the speech inputs "there is no evidence of active disease" or "no pneumonia was found," an ASR system may substitute a null word for the word "no" (i.e., may fail to recognize that "no" was said), resulting in the incorrect "there is evidence of active disease" or "pneumonia was found," either of which could have significant consequences as they could lead to a patient being incorrectly treated.

Thus, two or more words/phrases that are acoustically similar and that, when misrecognized for one another would have a significant consequences, can be included in a set of words/phrases. As set out below, in some embodiments an evaluation engine may use the words/phrases of a set to review recognition results and determine whether there are any indications of potential significant errors in the recognition results. Determining whether there are any indications of potential significant errors may include determining whether there is an indication in the recognition results that a word/phrase of a set was included in the top recognition result in error.

In some embodiments, sets of words/phrases (which may be pairs of words/phrases) to be evaluated by an evaluation engine may form an "alert" list against which the recognition results are evaluated in any of various ways to determine whether to generate an alert regarding potential significant errors in the recognition results. In some embodiments, as described below in connection with FIG. 4, the evaluation engine may determine, when the top result includes one word of a word pair, whether one or more of the alternative results includes the other word of the word pair and trigger an alert if so. As mentioned above, in some embodiments a word pair may include a null word as one word of the pair and this may present a special case of such an evaluation. As a null word appears in multiple positions throughout each of the recognition results (e.g., at the beginning and end of each result, and between each word of each result), the evaluation engine may simply evaluate the recognition results to determine whether the other, non-null word of the word pair appears in any of the recognition results, without evaluating words of the recognition results to determine if the null word appears. If the other, non-null word appears, the evaluation engine may trigger an alert.

As should be appreciated from the discussion of speech recognition processes above, words/phrases may appear in the recognition results based on an analysis of speech input by an ASR system using one or more acoustic models and one or more language models, and a resulting probability that a segment of the speech input corresponds to the word/phrase. In many cases, when a word/phrase appears in the recognition results and is evaluated using the evaluation engine, both the acoustic model(s) and the language model(s) indicate a high probability that a segment of the speech input corresponds to the word/phrase. However, all embodiments are not limited to evaluating whether a word or phrase indicates the presence of a potential significant error when both the acoustic model(s) and the language model(s) indicate a high probability that the word/phrase appeared in the speech input. Rather, for reasons discussed below, in some embodiments, an evaluation engine may determine whether a recognition result includes a potential significant error based on a probability provided by the acoustic model(s) and not the language model(s), or based on a probability provided by the language model(s) and not the acoustic model(s).

Accordingly, in addition to or as an alternative to comparing words/phrases included in a top result to words/phrases included in the alternative recognition results produced by the ASR system, in some embodiments an evaluation engine may evaluate recognition results using an output directly from an acoustic model and/or a language model to determine whether there is a potential significant error in the top recognition result.

For example, in some embodiments the evaluation engine may determine, when one word of a word pair in an alert list appears in a top result, whether an acoustic model indicates a likelihood above a threshold that the other word of the word pair may have been used in the speech input rather than the word that appeared in the top result and thus a likelihood that a correct recognition of the speech input includes the other word of the pair. To do so, the evaluation engine may determine, using the acoustic model, a likelihood that the segment of the speech input that was determined to correspond to the word of the word pair that appeared in the top result instead corresponds to the other word of the word pair (including, in some cases, determining whether the segment corresponds to a null word by determining, for example, whether the speech input corresponds to a combination of other words without a discrete word for the segment of speech input from which the word of the pair that appeared in the top result was determined). When the likelihood determined from the acoustic model is above a threshold, this may be indicative of a potential significant error in the top recognition result and the evaluation engine may trigger an alert.

Similarly, as another example, the evaluation engine may determine, when one word of a word pair in an alert list appears in a top result, whether a language model indicates a likelihood above a threshold that the other word of the word pair may have been used in the speech input rather that the word that appeared in the top result and thus a likelihood that a correct recognition of the speech input includes the other word of the pair. This may be done in any suitable way. For example, the evaluation engine may form a new alternative recognition result by replacing the word of the word pair that appeared in the top recognition result with the other word of the pair (including, in some cases, replacing with a null word) and then analyzing the new alternative recognition result using a language model to determine a likelihood of the new alternative recognition result appearing in the language and/or domain to which the language model corresponds. When the likelihood determined from the language model is above a threshold, this may be indicative of a potential significant error in the top recognition result and the evaluation engine may trigger an alert.

The language model that is used in this way by an evaluation engine may be any suitable language model. The language model may be the same language model as was used by the ASR system in producing the recognition results or a different language model. In some embodiments, the language model may be a standard language model for a language (e.g., the English language) and in other embodiments the language model may be a language model specific to a domain and that takes into account the consequences of potential significant errors in that domain. The language model may account for the consequences of potential significant errors by weighting likelihoods of words appearing, such as by adjusting the likelihoods to be higher when the words are associated with significant consequences in that domain (e.g., significant consequences for a patient in a medical domain). The likelihood for a word may be weighted based on information indicating the significance of the consequences in the domain when the word is incorrect in recognition results for the domain, including when the word is misrecognized for another word with which the word is paired. Weighting the likelihoods in this way may result in likelihoods that are above the threshold by which the likelihoods are evaluated even for expressions that occur infrequently, and thereby result in the triggering of an alert regarding the words. For example, where a likelihood of a string of words including the word "malignant" is low, but the medical consequences of misrecognizing this string of words are serious, the language model may produce a weighted likelihood that indicates a high likelihood of this string of words appearing in the domain language.

In some embodiments that use a language model for a language and/or for a domain that does not weight likelihoods based on significance of consequences of misrecognition of a word, an evaluation engine may perform such a weighting of likelihoods. For example, the evaluation engine may receive a likelihood of a recognition result appearing in a language and/or domain from a language model and may weight that likelihood, in the manner described above, according to information indicating a significance of consequences of misrecognition. In some such embodiments, once the evaluation engine has weighted the likelihood, the evaluation engine may evaluate the weighted likelihood to determine whether to trigger an alert.

Embodiments that evaluate likelihoods using an acoustic model or a language model and trigger an alert based on the likelihoods from the model may do so to increase the chances of indications of potential significant errors being identified, alerts being triggered, and errors being corrected during a review process. In some cases, this may increase the number of "false" alerts that are not errors that are presented to a reviewer. However, by including alerts regarding more potential errors that change a meaning of a recognition result in a way that would cause significant consequences in the domain when incorrect, the chance of a significant error being missed and the consequences of a significant error occurring may be lower.

In some embodiments, evaluation techniques that evaluate likelihoods using an acoustic model or language model may be used to identify potential significant errors in recognition results that are a consequence of misrecognition by an ASR system. In addition, or in the alternative in some embodiments, evaluation techniques that evaluate likelihoods using an acoustic model or language model may be used to identify potential significant errors in recognition results that result from the speaker. The speaker may have misspoken by speaking the wrong word/phrase, speaking an extraneous word/phrase, neglecting to speak a word/phrase, or in any other way. Determining whether a recognition result includes an indication of a potential significant error resulting from erroneous speech input may be carried out in substantially the same manner as the above-described process of using an acoustic and/or language model to determine whether a recognition result includes an indication of a potential significant error resulting from misrecognition by an ASR system. The above-described process compares a top recognition result to a set of one or more pairs of words/phrases and determines, when one word or phrase of a word/phrase pair appears in the top result, whether a language model indicates a likelihood above a threshold that the other word/phrase of the word/phrase pair may have been used in the speech input rather that the word that appeared in the top result. An evaluation engine may additionally or alternatively determine, using similar acts, when one word/phrase of a word/phrase pair appears in the top result, whether a language model indicates a likelihood above a threshold that the other word/phrase of the word/phrase pair could have appeared in the speech input and thus whether a speaker might have intended to speak the other word/phrase of the pair. When the likelihood, determined from the language model, that the other word/phrase could have appeared in the speech input is above the threshold, this may be indicative of a potential significant error in the top recognition result and the evaluation engine may trigger an alert.

FIG. 5 below illustrates an example of techniques that an evaluation engine may use to evaluate recognition results using word pairs and a language model to determine, when one word of a pair appears in a top recognition result, a likelihood that the speech input instead included the other word of the pair. As will be appreciated from the discussion below, the process of FIG. 5 is described as being executed together with the process 400 of FIG. 4. However, it should be appreciated that the process of FIG. 5 is not limited to being carried out together with the process of FIG. 4 and that embodiments may implement the processes of FIGS. 4-5 separately.

Thus, described below in connection with FIGS. 4-5 are various techniques that an evaluation engine may use to evaluate recognition results using word pairs. In embodiments that evaluate recognition results using a list of word pairs, the words that are included in the list of word pairs may be any suitable words for which it is desired to generate an alert. For example, in some embodiments, the word pairs in the list may be limited to pairs of words where a misrecognition might have serious consequences (e.g., in a particular domain) if not corrected.

FIG. 4 illustrates one illustrative process that may be used in some embodiments by an evaluation engine to evaluate recognition results to determine whether the recognition results include an indication of a potential error that is semantically significant. The process 400 of FIG. 4 begins in block 402, in which an evaluation engine receives a list of the N best recognition results produced by an ASR system during a recognition process performed on a speech input. As mentioned above, the N best list may include a top result and N−1 alternative recognition results.

Following block 402, the evaluation engine carries out a loop evaluating each word of the words included in the top recognition result of the N best recognition results. During the loop, each word of the top result may be evaluated iteratively, one at a time, or in any other suitable way. During the loop, the evaluation engine in block 404 selects the next word of the top result that has not yet been evaluated and determines in block 406 whether the selected word matches either word of any of the word pairs to which the top recognition result is to be compared. The determination of block 406 may be made in any suitable manner, including by looping through a set of word pairs and comparing the selected word to each word of the word pairs, by taking a hash of the selected word and searching hashes of the word pairs based on the hash of the selected word to determine whether the selected word appears in the word pairs, or in any other manner. For any word pairs for which the selected word matches one word of the pair, in block 408 the evaluation engine determines whether the other word of the pair appears in any of the alternative recognition results.

The determination of block 408 may be made by the evaluation engine in any suitable manner. In some embodiments, the evaluation engine may determine whether any of the alternative recognition results include the other word of the pair at any position within the result. In some cases, though, merely considering whether the other word of the pair appears at any position within the result may lead to false alerts that do not indicate a potential error in the top result (e.g., where the two words of the pair appear at different word positions between the top result and the alternative recognition result). The word pair, which may be a pair of acoustically-confusable words, is being used in block 408 to determine whether the ASR system correctly determined, for the top result, that a section of speech input corresponds to a word of the pair. If the ASR system determines, for the top result, that a first segment of the speech input corresponds to the first word of a word pair, and determines for an alternative result that a different segment of the speech input corresponds to the second word of the pair, this may not indicate anything about a potentially significant error. Therefore, in some embodiments, when one word of a word pair appears in a top result, the evaluation engine may determine in block 408 whether any of the alternative recognition results include the other word of the pair as a word corresponding to the same segment of the speech input as the word of the pair that appeared in the top result. This may be done in any suitable manner, as embodiments are not limited in this respect.

Some ASR systems may produce, for each word or phrase of a recognition result, an indication of which sounds in the speech input the ASR system identified as corresponding to the word/phrase. The indication that is produced may be in the form of a time or time range in the speech input, which indicates that the sounds in the speech input at that time or time range were identified by the ASR system as corresponding to the word/phrase. In block 408, the evaluation engine may determine whether the time or time range of the speech input that the ASR system identified, for the top result, as corresponding to the word that was selected in block 404 was also identified by the ASR system, for an alternative result, as corresponding to the other word of the word pair. Determining that the times or time ranges for the words are the same may aid the evaluation engine in determining that the words of the word pair appearing in the recognition results were determined by the ASR system to correspond to the same segment of speech input and thus are indicative of a potential significant error in the top recognition result. In some embodiments, the evaluation engine may not determine whether there is an exact correspondence between the times or time ranges for the words of the word pair, but may determine in block 408 whether the times or time ranges are within a margin (e.g., plus or minus one second or any other suitable margin).

Some ASR systems do not produce a time indication for words of recognition results. In some embodiments that operate with ASR system that do not produce time indications, dynamic phonetic alignment techniques may be used to align the top result and the alternative recognition results and thereby align words that correspond to sounds in the speech input. In embodiments that use dynamic phonetic alignment, once the recognition results have been aligned, the evaluation engine may determine whether the word selected in block 404 is aligned with the other word of a word pair. By determining whether the words of the word pair appear in the top result and an alternative result and that the words are aligned, the evaluation engine can determine whether the words were determined to correspond to the same segment of speech input and thus are indicative of a potential significant error in the top recognition result.

Regardless of how the determination is made in block 408, if the evaluation engine determines that the second word of the pair appears in an alternative recognition result (and optionally in an aligned position), the presence of the two words (which may be acoustically similar and confusable words) may be indicative of a potential error in the recognition results that may be semantically significant. Accordingly, in block 410 the evaluation engine triggers an alert regarding the top result and, in block 412, the evaluation engine optionally stores information about the potential significant error. Any suitable information may be stored in block 412, including information identifying the alternative recognition result that included the other word of the pair that indicated the presence of the potential significant error in the top result. The triggering and storing in blocks 410, 412 may be carried out in any suitable manner, including according to any of the techniques described above in connection with blocks 208, 210 of FIG. 2 or in other ways.

After the triggering and storing of blocks 410, 412, or when it is determined in blocks 406, 408 that both words of a pair were not included in the recognition results, the evaluation engine determines in block 414 whether there are more words of the top recognition result to be evaluated. If so, the evaluation engine returns to block 404 to select another word of the top result and begin a new iteration of the loop by evaluating the recognition results using the selected word. When it is determined that there are no more words of the top result to be evaluated, the process 400 ends.

As discussed above, embodiments are not limited to evaluating the recognition results using word pairs to determine whether both words of a word pair appear in the N best recognition results. Rather, in some embodiments, an evaluation engine may evaluate the top recognition result using a word pair and an acoustic and/or language model to determine, when one word of a word pair appears in the top recognition result, a likelihood that the speech input (from which the top recognition result was produced) instead included the other word of the pair. FIG. 5 shows an illustrative process in accordance with these embodiments.

The process 500 of FIG. 5 may, in some embodiments, be carried out together with the process 400 of FIG. 4, such as by being carried out within the loop of the process 400. Accordingly, prior to the start of the process 500 of FIG. 5, an evaluation engine may receive the list of N best recognition results from an ASR system as in block 402 of FIG. 4 and may select, as in block 404 of FIG. 4, a word pair by which to evaluate the top recognition result for indications of potential significant errors. Additionally, in some embodiments, prior to the start of the process 500 of FIG. 5, an evaluation engine may determine, as in blocks 406, 408 of FIG. 4, that the list of N best recognition results do not include both words of the currently-selected word pair. However, it should be appreciated that embodiments are not limited to implementing the process 500 of FIG. 5 together with the process 400 of FIG. 4 or, where the two processes are implemented together, to integrating the process 500 with the process 400 in any particular manner.

The process 500 begins in block 502, in which an evaluation engine identifies, for a currently-selected word pair, a position in the top recognition result of one of the words of the word pair. In block 504, the evaluation engine replaces the word of the word pair that appears at that position with the other word of the word pair. Replacing the word that appears in the top recognition result with the other word of the word pair creates a new string of words that is possibly a new recognition result. In block 506, the evaluation engine uses a language model, which corresponds to a language and/or domain of the speech input, to determine a likelihood of the string of words of the new recognition result appearing in speech/text in the language or domain. Upon receiving the likelihood, in block 508 the evaluation engine compares the likelihood to a threshold to determine whether the likelihood of the new recognition result appearing in the language or domain is above the threshold.

When the likelihood of the new recognition result is above the threshold, this indicates that the word of the pair that did not appear in the top recognition result, but was inserted to form the new recognition result, is sufficiently likely to have appeared in the speech input instead of the word that appeared in the top result for an actions to be taken. In other words, when the likelihood is above the threshold, it is sufficiently likely that the word of the pair appeared in the top recognition result in error. Further, because the words of the word pair are those words that would have serious consequences if one was misrecognized as the other, the likelihood being above the threshold is indicative of a potential significant error in the top recognition result. Accordingly, if the evaluation engine determines in block 508 that the new recognition result produced in block 506 is sufficiently likely to appear, then in block 510 the evaluation engine triggers an alert regarding the potential significant error and optionally stores information identifying the potential significant error, which may include information identifying the other word of the word pair and the position at which the other word was determined to be sufficiently likely to appear. The triggering and storing in block 510 may be carried out in any suitable manner, including according to any of the techniques described above in connection with blocks 208, 210 of FIG. 2 or in other ways.

Once the alert has been triggered and information stored in block 510, or if the new recognition result of block 506 was determined in block 508 not to be sufficiently likely to appear in the language or domain, the process 500 ends.

In the process 500 described above, the evaluation engine determines whether a likelihood of the new recognition result appearing in the domain is above a threshold to determine whether to trigger an alert. It should be appreciated that embodiments that implement a process for evaluating likelihoods of recognition results generated by replacing words of the top recognition result are not limited to evaluating likelihoods using a threshold to determine whether to trigger an alert. In some embodiments, rather than evaluating the likelihood using a threshold, an evaluation engine may compare a likelihood of the new recognition result appearing to a likelihood of the top recognition result appearing. Based on the comparison of the likelihoods, the evaluation engine may determine whether to trigger an alert. For example, if the likelihood of the new recognition result is much lower than the likelihood of the top recognition result, the evaluation engine may determine that an alert should not be triggered. Determining whether the likelihood of the new recognition result is much lower than the likelihood of the top recognition result may include, for example, determining whether the likelihood of the new recognition result is more than 10% less likely than the top recognition result, less than half as likely as the top recognition result, less than one-tenth as likely as the top recognition result, or has any other suitable relative value as compared to the likelihood of the top recognition result. Embodiments that implement a process for evaluating likelihoods of recognition results generated by replacing words of the top recognition result are not limited to comparing likelihoods of recognition results in any particular manner.

In embodiments that evaluate recognition results using word pairs and a language model as in the examples of FIG. 5, any suitable language model or models may be used. In some embodiments, the language model may be a standard language model for a language (e.g., the English language) or for a domain (e.g., the medical domain). It may be the same language model(s) used by the ASR system in producing the N best recognition results based on the speech input. In some embodiments, as mentioned above, the language model(s) may weigh likelihoods of one or more words appearing in the language or domain at least in part based on information identifying the significance of the consequences of misrecognizing the word(s), including misrecognizing one paired word for another. The information may indicate the consequences of misrecognition in general or the consequences in a particular domain. For example, a language model may be related to a medical domain and, in addition to indicating a likelihood of words appearing in the medical domain, may weigh the likelihood of the words appearing based on information indicating the significance of the consequences in the medical domain if those words are misrecognized. Weighting the likelihood may include increasing the likelihood of the words appearing in the language or domain. By increasing the likelihood based on the consequences of misrecognition (e.g., when the words would cause serious medical consequences if misrecognized), the likelihood of the words appearing may be increased and may be more likely to exceed the thresholds against which the likelihoods are compared in the process of FIG. 5. When the likelihood exceeds the threshold, an alert is triggered and a reviewer may review the words more carefully. Increasing the likelihood when the words would cause serious consequences if misrecognized therefore increases the chances that the threshold would be exceeded, an alert would be triggered, and a reviewer would review the words more carefully, which may reduce the chances of the serious consequences occurring from a misrecognition.

Additionally, as discussed above, in some embodiments an evaluation engine may receive a likelihood of a recognition result appearing in a domain from a language model that does not perform such a weighting, and the evaluation engine may weigh the likelihood in the manner described above. Once the evaluation engine has weighed the likelihood based on information indicating a significance of consequences of misrecognition in the domain, the evaluation engine may evaluate the likelihood to determine whether to trigger an alert.

As discussed above, it should be appreciated that, in some embodiments, a word pair that is evaluated by the processes 400, 500 of FIGS. 4 and 5 may include a null word (i.e., silence or no word). In some embodiments, a word pair that includes a null word may be evaluated just as any other word pair. In other embodiments, though, a word pair that includes a null word may be considered a special case that is processed using operations that may be different in some ways from the operations used to evaluate other word pairs. The process 600 of FIG. 6 illustrates operations carried out in some embodiments when a word pair includes a null word, which operations may be similar in some ways to operations of processes 400, 500 of FIGS. 4-5 discussed above.

The process 600 of FIG. 6 may be carried out together within a loop evaluating word pairs and recognition results, such as the loop described above in connection with FIG. 4. Accordingly, prior to the start of the process 600 of FIG. 6, an evaluation engine may receive a list of N best recognition results from an ASR system (such as in block 402 of FIG. 4) and may select (such as in block 404 of FIG. 4) a word pair by which to evaluate the N best recognition results for indications of potential significant errors. The word pair that is selected includes a null word and a non-null word.

The process 600 begins in block 602, in which the evaluation engine determines whether a non-null word paired with a null word in the currently-selected word pair appears in any of the N best search results, including either the top recognition result or any of the N−1 alternative recognition results. The determination of block 602 can be considered to serve the same function as the two determinations of blocks 406, 408 of FIG. 4. The blocks 406, 408 determined whether the words of a word pair appear in both the top recognition result and one of the alternative recognition results. In block 602, however, the evaluation engine need only determine whether the non-null word appears in any of the N best recognition results and may not evaluate words of the recognition results to determine if a null word appears, as every result necessary includes a null word. This is because a null word "appears" in all recognition results (i.e., at least at the beginning and end of a recognition result, and between each of the words of a recognition result when the recognition result includes multiple words). In embodiments that evaluate a word pair that includes a null word to determine whether both of the words of the pair appear in the recognition results, the null word will always be determined to appear. Thus, to determine whether both words of a word pair appear in the N best recognition results, it may be sufficient to determine whether the non-null word appears in any of the N best recognition results.

If the evaluation engine determines in block 602 that the non-null word appears in any of the N best recognition results, then in block 608 the evaluation engine triggers an alert and optionally stores information identifying the potential significant error, which may include information identifying the word and the position of the recognition result at which it appeared. The triggering and storing of block 608 may be carried out in any suitable manner, including as described above in connection with block 208, 210 of FIG. 2 or in other ways.

If, however, in block 602 the evaluation engine determines that the non-null word does not appear in any of the N best results, then (as in the process 500 of FIG. 5) the evaluation engine uses a language model to determine whether the non-null word was sufficiently likely to have appeared in the speech input from which the top recognition result was produced, even though the non-null word does not appear in N best recognition results.

Since the null word that is paired with the non-null word that appears at multiple positions in the top recognition result (i.e., at the beginning and end of the result, and between words of the result), replacing the null word with the non-null word (as in block 504 of FIG. 5) includes iteratively replacing each occurrence of the null word in the top recognition result with the non-null word and determining the likelihood of the resulting new recognition result using the language model. In other words, in block 604, the evaluation engine iteratively inserts the non-null word of the pair into the top recognition result into each word position of the top recognition result (i.e., into the beginning of the top recognition result, then between the first word and second word, then the second and third words, etc.) and for each insertion uses the language model to determine a likelihood that the resulting string of words would appear in the language or domain to which the language model relates. The evaluation engine then compares, in block 606, each of these likelihoods to a threshold to determine whether, for each string of words that includes the non-null word, the likelihood of the string of words appearing in the language or domain is above the threshold.

When the likelihood of one of the strings of words is above the threshold, this indicates that the non-null word is sufficiently likely to have appeared in the speech input at the position into which the non-null word was inserted into the top recognition result. When the non-null word is sufficiently likely to have appeared in the position, this may be indicative of a potential error in the top recognition result. Further, because the words of the word pair may be those words that would have serious consequences if misrecognized, when the non-null word is sufficiently likely to have appeared in the speech input at the position, this may be indicative of a potential significant error in the top recognition result. Accordingly, if the evaluation engine determines in block 606 that that the non-null word is sufficiently likely to have appeared in any of the positions, then in block 608 the evaluation engine triggers an alert regarding a potential significant error and optionally stores information identifying the potential significant error, which may include information identifying the non-null word and the position at which the non-null word was determined to be sufficiently likely to appear. The triggering and storing in block 608 may be carried out in any suitable manner, including according to any of the techniques described above in connection with blocks 208, 210 of FIG. 2 or in other ways.

Once the alert has been triggered and information optionally stored in block 608, either in response to identifying in block 602 that the non-null word in any of the N best recognition results or determining in block 606 that the non-null word was sufficiently likely to have appeared in a position of the top recognition result, or if it was determined in block 606 that the word was not sufficiently likely to appear, the process 600 ends.

The processes 400-600 of FIGS. 4-6 were described as processing recognition results in an N best list format. As discussed above, embodiments are not limited to processing recognition results in an N best list format. In embodiments that operate with recognition results in other formats, such as a lattice format, other processes may be carried out on the recognition results to implement techniques described in connection with FIGS. 4-6. For example, an evaluation of the words of the recognition results to word pairs may be carried out using recognition results in a lattice format. In some embodiments, a lattice format may be advantageous for evaluating the recognition results using word pairs, as the lattice will identify directly in the format of the lattice the words that were identified by the ASR system as alternatives that may each correspond to the same sounds of the speech input. As mentioned above, the lattice format includes directed interconnections between nodes of the lattice and the directed interconnections identify paths through the lattice that each correspond to a recognition result. The paths through the lattice may overlap when multiple recognition results include the same word(s) corresponding to the same sounds from the speech input. When the paths through the lattice diverge to different nodes, this indicates that the ASR system has identified different words as corresponding to the same sounds of the speech input. The different words are aligned alternatives for the same sounds of the speech input. The lattice can therefore be evaluated to determine whether, for the parts of the lattice that include alternative words, whether the word for the top recognition result appears in a word pair and, if so, whether one of the alternative words is the other word of the word pair. The lattice may also be evaluated using word pairs and a language model to determine whether, if any of the words of the word pairs appears in the lattice, the other word of the pair can be substituted in the paths of the lattice through the node for that word to create a string of words that is sufficiently likely to appear in the language/domain. It should be appreciated, however, that embodiments that operate with a lattice are not limited to operating with a lattice in the manner described above, and that embodiments may process a lattice and word pairs in any suitable manner.

In the examples of FIGS. 4-6, an evaluation engine uses pairs of words to determine whether there is an indication of a potential error in the recognition results. The pairs of words that are evaluated in these processes, or in any other process operating in accordance with techniques described herein, may be determined in any suitable manner, as embodiments are not limited in this respect.

In some embodiments, the pairs of words may be determined through a manual process, in which one or more people identify pairs of words (including null words) that may be confused by an ASR system and might have significant consequences if misrecognized. After the pairs of words are manually assembled, the evaluation engine may use the pairs in any of the above-described processes or any other process.

In some embodiments, as an alternative to or in addition to a manual process, an automated process of determining word pairs may be carried out. Automated processes that may be used in some embodiments may determine words that might be confused by an ASR system (e.g., because of acoustic similarity), the confusion of which might have significant consequences, and may pair these words (including nulls) together in a set of word pairs. Automated processes may determine whether confusion might have significant consequences in any suitable way. For example, the processes may determine confusable words that have different meanings or that change a meaning of a phrase or sentence when included in the phrase/sentence. For example, some automated processes may identify words, phrases, or sentences that have meanings that are inconsistent (e.g., meanings that are opposites of one another) or of different degrees of specificity (e.g., pneumonia and acute pneumonia). For example, an automated process might determine that the phrases "the growth is malignant" and "the growth is nonmalignant" have related, opposite meanings and determine that the opposite meanings is based on the words "malignant" and "nonmalignant." An automated process might also determine that the phrases "there is evidence of active disease" and "there is no evidence of active disease" have related, opposite meanings and that the opposite meanings is based on the word "no." Some automated processes, when evaluating these phrases, may then pair the words "malignant" and "nonmalignant" and a null word and "no" based on this evaluation.

Figure 7:
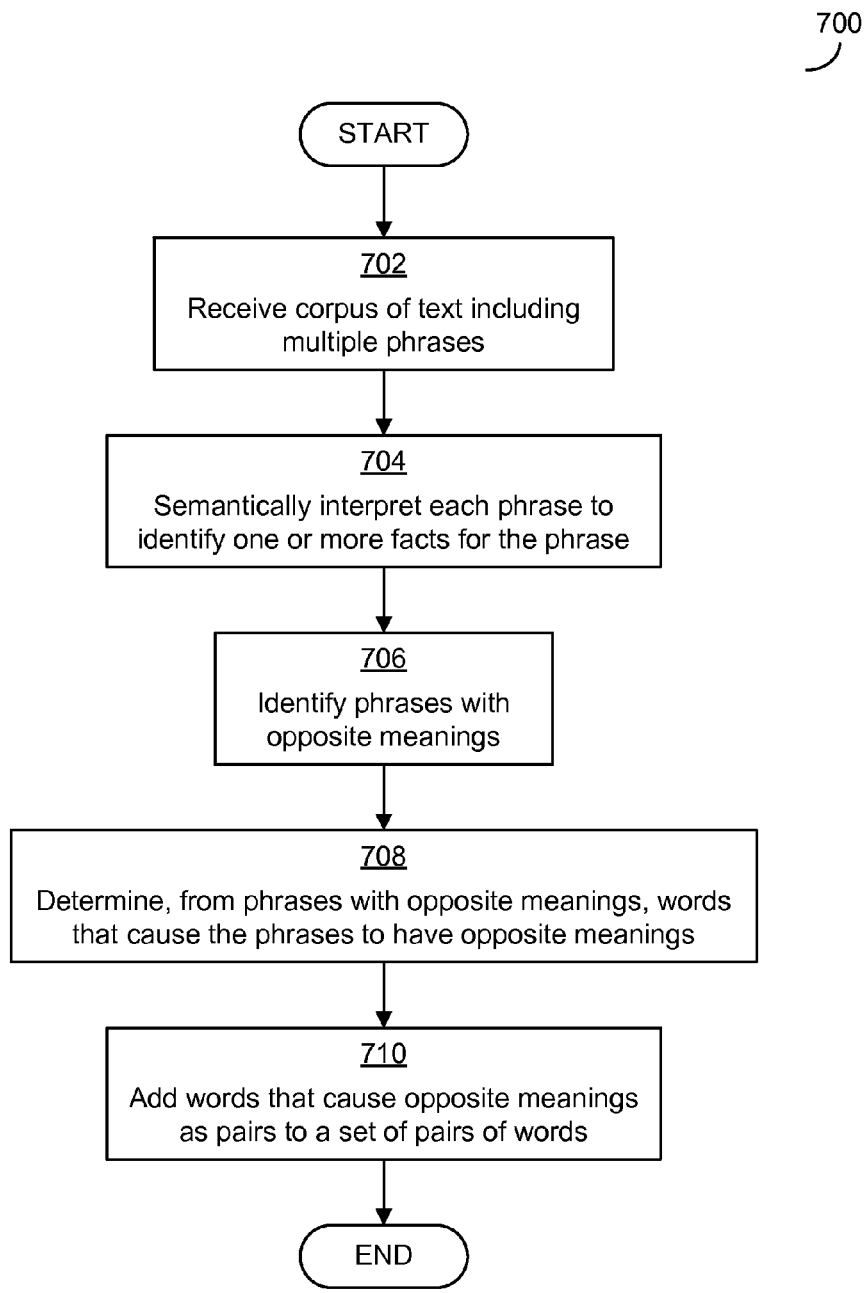
FIG. 7 is a flowchart of an exemplary process that may be carried out in some embodiments to create a set of words useable to evaluate recognition results to determine whether there are indications of potential significant errors in the recognition results.

FIG. 7 illustrates one process that may be used in some embodiments by a pairing engine to evaluate phrases and determine pairs of words that are related in meaning. The process 700 of FIG. 7 begins in block 702, in which the pairing engine receives a corpus of text in a language, where the corpus includes multiple words and/or phrases. The corpus of text may be any suitable corpus including any suitable text, such as a set of texts of medical journal publications, medical reports, novels, newspaper and magazine articles, blog posts, and/or any other texts.

In block 704, the pairing engine semantically interprets each phrase of the corpus of text to identify one of more significant facts expressed in the phrases. The significant facts may be any suitable set of significant facts, including facts significant for a particular domain. The semantic interpretation of block 704 may be carried out in any suitable manner. In some embodiments, for example, the pairing engine may interact with a semantic interpretation engine that is configured to interpret text in a language matching that of the corpus to determine significant facts expressed in each of the phrases. A semantic interpretation engine may be implemented in any suitable manner, one example of which was discussed above in connection with the semantic interpretation engine 106D of FIG. 1.

In block 706, the pairing engine identifies pairs of phrases for which the significant facts expressed in the phrases have opposite meanings. The determination in block 706 may be made in any suitable manner. In some embodiments, for example, an index of significant facts that can be identified by the semantic interpretation facility and relationships between those facts may be predefined. The predefined relationships may identify significant facts that have opposite meanings. Where such predefined relationships are used, in block 706 the significant facts that were identified in block 704 from the semantic interpretation of the phrases of the corpus may be evaluated using the predefined relationships to identify any significant facts that have opposite meanings. When significant facts that have opposite meanings are identified, the phrases from which the significant facts were identified by the semantic interpretation engine may be identified as having opposite meanings.

The phrases that are identified as having opposite meanings may then be used in block 708 to determine words that have opposite meanings or that cause phrases to have opposite meanings. These words may be identified by determining, from the phrases that have opposite meanings the words of the phrases that result in the phrases having opposite meanings. The words can be identified in block 708 in any suitable manner, as embodiments are not limited in this respect.

In some embodiments, the pairing engine may identify the words in block 708 by modifying the phrases identified as having opposite meanings in block 706. The modification may be carried out in any suitable manner, including by iteratively removing words or combinations of words from each of the phrases and semantically interpreting the modified phrases. Once a modified phrase (corresponding to one of a pair of phrases having an opposite meaning) is semantically interpreted, the pairing engine may determine whether the modified phrase expresses the significant fact that was identified as having a meaning opposite to that of a significant fact of another phrase. If the modified phrase is determined to express the significant fact, the pairing engine can determine that the word(s) that cause the phrase to express the significant fact are included in the modified phrase. Through iteratively modifying the phrase and identifying what modifications lead a modified phrase to express the significant fact and which lead the modified phrase to not express the significant fact, the pairing engine can determine the word(s) that correspond to the significant fact. When the pairing engine carries out this process for each of a pair of phrases that have opposite meanings, the pairing engine can determine a pair of series of one or more words, such as a pair of words and/or phrases, that lead phrases to have opposite meanings. Such a pair of series of words may be indicative of a potential error in recognition results when both series of words of the pair are present in recognition results derived from a same speech input. For example, when a top recognition result includes one series of words of a pair and an alternative recognition result includes the other series of words of a pair, this may be indicative of a potential error in the recognition results.

It should be appreciated that while two series of words determined in this manner are not identical, there may be some overlap between the two series of words. When the two series of words determined from recognition results include multiple words, in some cases one or more of the words of a first series of words may appear in the second series of words. In other cases, however, none of the words of a first series may appear in a second series.

In some embodiments, the modification of phrases described above may not be performed for all phrases that have opposite meanings, but instead may only be done for phrases that have similar wording and/or similar sounds. This is because performing a modification of phrases without similar wording/sound to determine the words of those phrases that result in different meanings could lead to pairs of words that are dissimilar and not acoustically confusable and thus are unlikely to be confused by an ASR system. For example, while the phrases "there is no evidence of active disease in the abdomen" and "disease present in the abdomen" may be identified in block 706 as phrases having opposite meanings, the words of the phrases are dissimilar. Any attempt at iteratively removing words to determine the words that cause the meanings to be opposite would thus identify words that are unlikely to be confused by an ASR system, such as the acoustically-dissimilar words "no" and "present." Words that are unlikely to be confused by an ASR system, in some embodiments, may not be very useful to be associated as a pair and used to evaluate recognition results. This is because when the words are unlikely to be confused by the ASR system, the words are also unlikely to be associated with a misrecognition by the ASR system due to such confusion and unlikely to be a source of a potential significant error.

Accordingly, in some embodiments, a pairing engine may select from the phrases identified in block 706 as having opposite meanings pairs of phrases that are similar in wording or similar in the sounds used to express the phrases. The pairing engine may use any suitable technique for comparing wording of phrases or sounds for phrases, as embodiments are not limited in this respect. For example, a corpus of text may include the phrases "there is no evidence of active disease in the abdomen," "no disease in the abdomen," "disease present in the abdomen," and "there is evidence of active disease in the abdomen," and a pairing engine may identify that the first two phrases have a meaning that is the opposite of the latter two phrases. The pairing engine may then determine that the pair of phrases "there is no evidence of active disease in the abdomen" and "there is active disease in the abdomen," and the pair of phrases "no disease in the abdomen" and "disease present in the abdomen," have similar wording and/or sounds.

Determining whether the pairs of phrases have similar wording and/or sounds may be done in any suitable manner, including by comparing wording and/or by comparing sounds. For example, pairs of phrases may be considered similar when the majority of the words included in one phrase appear in the other phrase in the same order and position as in the first phrase. As another example, pairs of phrases may be considered similar when the phrases are acoustically confusable. A pair of phrases may be acoustically confusable when the majority of sounds in one phrase appear in the other phrase in the same order and position as in the first phrase. Any suitable technique may be used to determine whether pairs of phrases are similar in wording and/or sound.

Once pairs of phrases similar in wording and/or sound are identified, the iterative process described above of removing words/phrases from each phrase of the pair of phrases and semantically interpreting the resulting phrase can be carried out for the identified pairs. Through the iterative process, pairs of words that cause the pairs of phrases to express different significant facts can be identified and, because the words were identified from phrases that are similar in wording and/or sound, the identified pair of words includes words that an ASR system may confuse. In some embodiments, once the pairs of words are identified by the pairing engine from the iterative process, the pairing engine may further determine whether the words of the pair may be confused by an ASR system by determining whether the words are acoustically similar and acoustically confusable. If the words of a pair are not acoustically similar, then the pair of words may be rejected as unlikely to be confused by an ASR system.

In block 710, after the pairing engine has determined in block 708 one or more pairs of words that cause phrases to have opposite meanings and that may be confused by an ASR system, the pairing engine may add the pairs to a set of pairs of words that may be used by an evaluation engine in evaluating recognition results. Once the pairs of words have been added to the set, the process 700 ends.

It should be appreciated that embodiments that include an automated process for identifying pairs of words that, when present in recognition results, are indicative of a potential significant error in the recognition results are not limited to carrying out the automated process of FIG. 7 and that other processes are possible. For example, while the exemplary process 700 of FIG. 7 could be used to identify words that are associated with opposite meanings of phrases, other embodiments may implement a process that identifies words that are associated with any other suitable relationship between meanings of phrases, including words that are associated with any suitable type of inconsistent meaning other than opposite meanings (e.g., different degrees of specificity). Embodiments are also not limited to identifying words associated with one type of relationship between meanings of phrases, as some embodiments may identify words associated with multiple types of relationships between meanings of phrases.

Additionally, as discussed above, it should be appreciated that while, for ease of description, the examples of FIGS. 4-7 were discussed in terms of word pairs, embodiments that evaluate words of recognition results to determine whether there are indications of potential errors that may be semantically meaningful are not limited to operating with pairs of words. Some embodiments may evaluate recognition results using pairs of words and/or phrases, which may include word/word pairs, phrase/phrase pairs, and/or word/phrase pairs.

It should also be appreciated that while the examples above were discussed in terms of pairs of words and/or phrases, embodiments that evaluate recognition results using sets of words and/or phrases to determine whether there are indications of potential significant errors are not limited to operating with pairs of words and/or phrases. Instead, embodiments may operate with sets of words/phrases of any suitable size. For example, embodiments may evaluate the recognition results using sets of three or more words and/or phrases. When sets of words/phrases larger than two (i.e., larger than pairs) are used, processes like the ones discussed above may be used that determine, when one word/phrase of a set appears in the top result, whether any of the other words/phrases of the set appear in the alternative recognition results.

Various processes have been discussed for detecting indications of potentially significant errors in recognition results by comparing recognition results or contents of and/or information about recognition results. For example, in connection with FIG. 3, a comparison of facts extracted from recognition results was used to determine whether there were indications of potentially significant errors in recognition results, and in connection with FIGS. 4-6, a comparison of words included in recognition results was used to determine whether there were indications of potentially significant errors in recognition results. It should be appreciated, however, that embodiments are not limited to reviewing and comparing top recognition results and alternative recognition results to determine whether there are indications of potential significant errors in the recognition results. In some embodiments, for example, an evaluation engine may determine whether one or more words included in the top recognition result are themselves indicative of a potential error in the top result.

In some embodiments, the top recognition result may be evaluated for words that are unlikely to appear in the speech input for a particular domain. For example, in a medical context, the word "pizza" may be unlikely to appear in a speech input. The appearance of the word "pizza" in a recognition result in a medical context (e.g., "there is evidence of active pizza in the abdomen") may therefore be an indication of a potential error in the recognition result.

Figure 8:
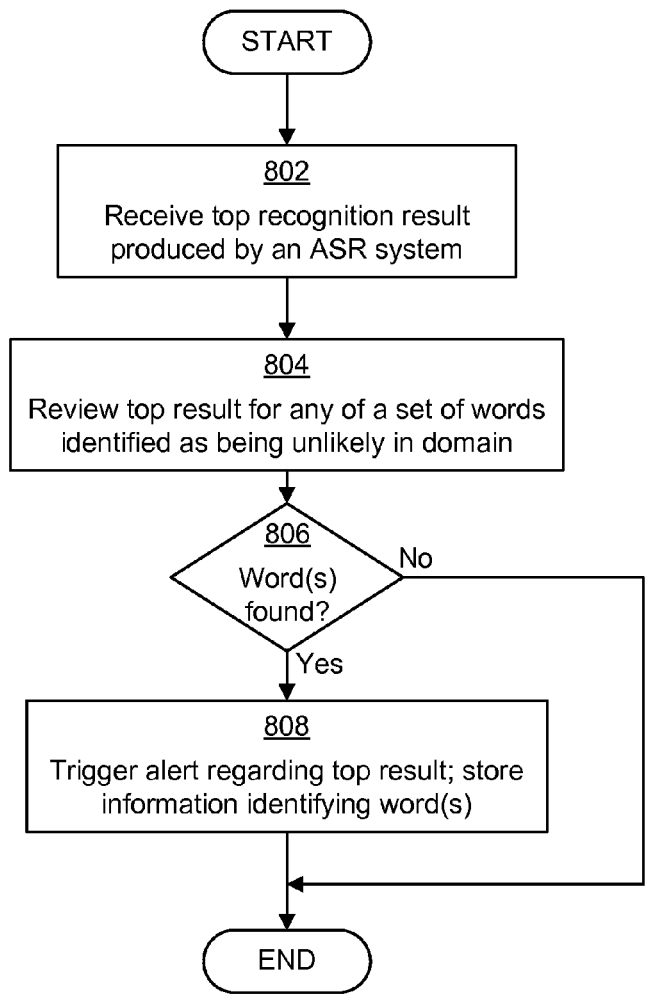
FIG. 8 is a flowchart of an exemplary process that may be carried out in some embodiments to identify potential significant errors based on whether a top recognition result for speech in a domain includes words that are unlikely to appear in recognition results for the domain.

FIG. 8 illustrates an exemplary process 800 that may be used in some embodiments to review a top recognition result generated by an ASR system to determine whether the top recognition result includes one or more words that are identified as being unlikely to appear in the domain to which the speech input relates. The words unlikely to appear may be identified in any suitable way. In some embodiments, prior to the start of the process 800, a set of words that are unlikely to appear may have been identified in any suitable manner, such as through a manual and/or automated process. In some embodiments, a word may be determined to be unlikely to appear in a domain through a manual and/or automated analysis of a likelihood of the word appearing in the domain. For example, in some such embodiments, when it is determined that the likelihood of the word or phrase appearing is below a threshold, the word or phrase may be determined to be sufficiently unlikely to appear in the domain for the word or phrase to be flagged as unlikely.

The process 800 begins in block 802, in which an evaluation engine receives the top recognition result produced by an ASR system for a speech input. In block 804, the evaluation engine reviews words of the top result to determine whether the top result includes any of a set of one or more words identified as being unlikely to appear in the domain to which the top recognition result relates. In block 806, the evaluation engine determines whether any of the words were found and, if so, proceeds to block 808, in which an alert regarding the top result is triggered. In addition, information identifying the one or more words that were identified as being unlikely to have appeared in the domain is stored, although storing this information is optional and not performed in all embodiments. The triggering and optional storing in block 808 may be carried out in any suitable manner, including according to any of the techniques discussed above in connection with blocks 208, 210 of FIG. 2.

Once the evaluation engine has triggered an alert in block 808, or if it is determined in block 806 that no words of the top result were identified as being unlikely to appear in the domain, the process 800 ends.

The process 800 may be used to identify any words that are not likely to be included in a speech input for any domain to which the speech input relates. In one example given above, a domain may be the "medical" domain. It should be appreciated, however, that embodiments are not limited to any particular domains. Further, it should be appreciated that embodiments are not limited to any particular type of domain or breadth of subjects for a domain. For example, while "medicine" may be a domain in some embodiments, in other embodiments a more focused domain may be specified, such as "abdominal examination" or "CT procedure" or "x-ray of left leg." For a more focused domain, a set of words that are identified as unlikely to appear in the domain might include words that are likely to appear in other domains to which the focused domain relates. For example, while the word "leg"

might be considered common or likely to appear for a "medicine" domain, the word "leg" might be considered uncommon or unlikely to appear in an "abdominal examination" domain. As another example, while the phrase "right leg" might be considered common or likely to appear for a "medicine" domain, the phrase "right leg" might be considered unlikely to appear in an "x-ray of left leg" domain. As a third example, while the number seventeen may be common in the "medicine" domain, it may be uncommon in the "blood pressure reading" domain.

It should also be appreciated that embodiments are not limited to evaluating a recognition result based on only one domain and words that are unlikely to appear in that domain. In some embodiments two or more domains may be evaluated to determine if the speech input includes words unlikely to appear in either domain. For example, in some embodiments a speech input may relate to both the domains "pelvic exam" and "medical examination of a female," when the speech input regards a pelvic exam of a woman. In the domain "pelvic exam," the word "prostate" may not be uncommon or considered to be unlikely to appear in a speech input. However, the word "prostate" might be considered uncommon in the "medical examination of a female" domain. Accordingly, in embodiments in which a set of unlikely words is created from a union of the sets of unlikely words for two domains, a word for either domain is included in the set and identified as an indication of a potential error when included in a recognition results for a speech input that relates to these two domains.

Embodiments are not limited to operating with any particular domains nor to operating with a fixed domain or fixed set of unlikely words for each recognition result. Rather, in some embodiments, an evaluation engine may select, for each recognition result to be evaluated, a domain to be evaluated for words unlikely to appear. The evaluation engine may select the domain based on information identifying the speech input. For example, in some embodiments an evaluation engine may be notified of a domain to which a speech input relates, or of multiple domains to which the speech input relates, by receiving information that identifies the speech input. The notification of the domain(s) for a speech input may include any suitable information and be at any suitable level of specificity. For example, in a medical context, a notification of one or more domains may include information about a patient to which the speech input relates (e.g., age, gender, etc.), information about a medical procedure to which the speech input relates, information about a medical report of which the speech input is a part, and/or information about a part of the medical report to which the speech input relates. Based on this information, the evaluation engine may select one or more domains to which the speech input relates and identify, based on each domain, words unlikely to appear in the speech input.

Some embodiments discussed above relate to evaluating words and/or phrases (including meanings of the words/phrases) included in recognition results generated by an ASR system to determine whether there is an indication of a potential error in the recognition results. It should be appreciated, however, that all embodiments are not limited to evaluating the words and/or phrases of recognition results to determine whether there is an indication of a potential error. Some embodiments may additionally or alternatively use any other information produced by an ASR system based on speech input to determine whether there is an indication of a potential error.

Further, more embodiments are not limited to determining whether there is an indication of a potential significant error that resulted from a misrecognition by an ASR system. Rather, as discussed above, some embodiments may determine whether a recognition result may contain a potential significant error that resulted from a speaker misspeaking, such as by the speaker speaking an incorrect word.

Applicants have recognized and appreciated that speech input may include a potential error when a speaker is uncertain of the speech input that her or she should be providing. Applicants have further recognized and appreciated that, in some cases, when a speaker is uncertain whether he or she is speaking correctly, the speaker may speak in a manner than is different from the speaker's normal speech patterns, such as with a nonstandard duration or with a nonstandard pitch. For example, when the speaker is uncertain whether content of his or her speech is correct, the speaker may insert more pauses into his or her speech input, stretch syllables or phonemes to longer durations than is typical, or speak with a higher than normal pitch or with a vocal fry.

Applicants have therefore recognized and appreciated that an evaluation of prosody information for speech input, which may include durational information and pitch information, may provide an indication of whether a speaker was uncertain of the speech input that was provided and is being evaluated. Applicants have also recognized and appreciated that when a speaker is detected as being uncertain of the speech input, there is an increased likelihood that the speech input may include a potential error, so that it may be desirable to trigger an alert regarding recognition results for the speech input such that a reviewer who reviews the speech input can confirm that the speech input is correct. As discussed above, a reviewer may be more likely to carefully review a recognition result when the reviewer has been alerted that the recognition result may include a potential error.

Figure 9:
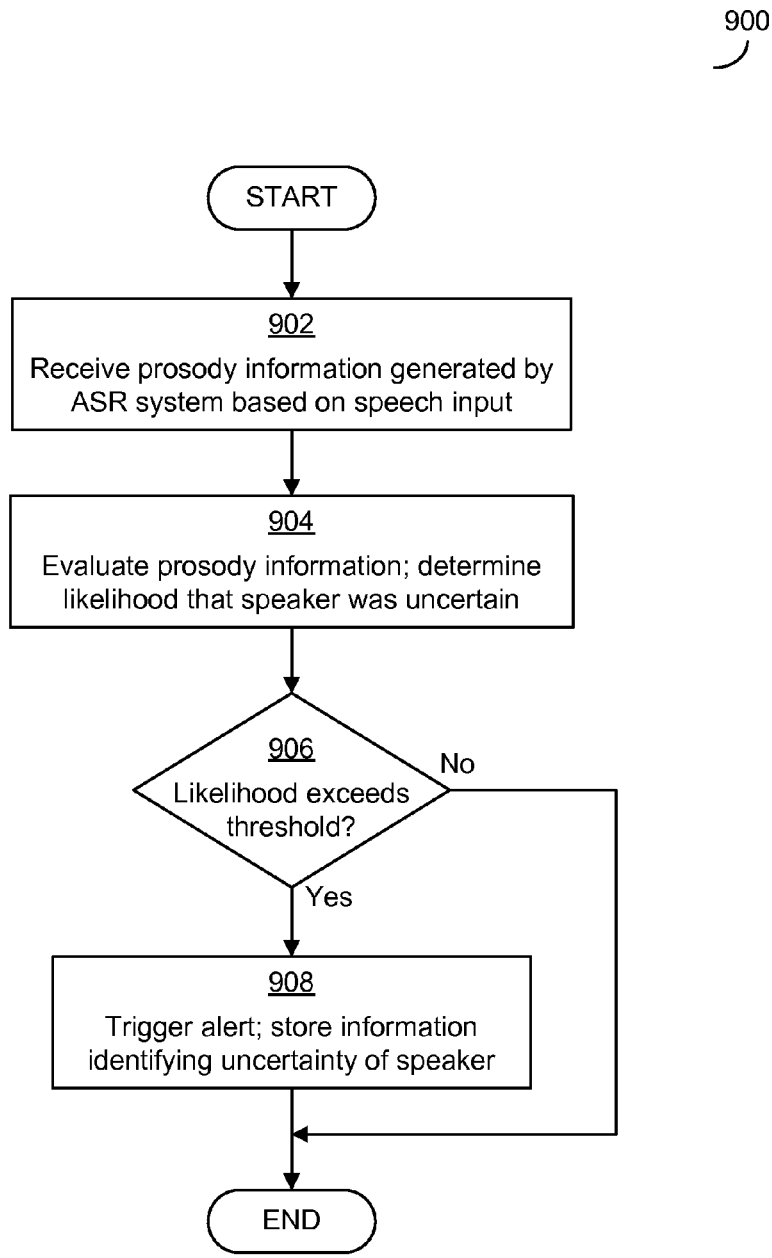
FIG. 9 is a flowchart of an exemplary process that may be carried out in some embodiments to determine a likelihood that a speaker who provided speech input was uncertain when providing the speech input.

FIG. 9 illustrates one process that may be implemented in some embodiments for evaluating prosody information produced by an ASR system based on speech input to determine whether there is a potential error in the speech input. The process 900 of FIG. 9 may be carried out by an evaluation engine based on output of an ASR system. Prior to the start of the process 900, speech input is received and processed by an ASR system, and the ASR system generates prosody information from analyzing the speech input. The prosody information may be generated by the ASR system in any suitable manner, including using techniques that are known in the art. In some cases, an ASR system may generate the prosody information as a byproduct of performing a speech recognition process that attempts to identify words and/or phrases included in the speech input. In other cases, an ASR system may generate the prosody information separately, rather than as part of the process of attempting to identify words and/or phrases included in the speech input.

The process 900 begins in block 902, in which the evaluation engine receives prosody information from the ASR system. The evaluation engine may receive the prosody information in any suitable manner, including via any of the techniques discussed above in connection with FIG. 2. For example, the evaluation engine may receive the prosody information directly from the ASR system or may retrieve the prosody information from a data store in which prosody information generated by the ASR system was stored. In some embodiments, the evaluation engine may receive the prosody information along with other information produced by the ASR system. For example, the evaluation engine may receive the prosody information from the ASR system together with recognition results that include words and/or phrases that the ASR system determined may have been included in the speech input.

In block 904, the evaluation engine evaluates the prosody information and determines, based on the evaluation, a likelihood that the speaker was uncertain of the speech input when the speaker provided the speech input. The evaluation of block 904 may be carried out in any suitable manner, as embodiments are not limited in this respect. In some embodiments, the evaluation engine may compare the prosody information received in block 902 to reference prosody information. When the prosody information is compared to the reference prosody information, an evaluation engine may determine whether variations from the reference prosody information may be signs of potential uncertainty in the speaker.

In embodiments in which prosody information is compared to reference prosody information, the reference prosody information may be any suitable information regarding prosody that is determined from any suitable source. In some embodiments, the reference prosody information may be speaker specific, such as reference prosody information determined for the particular speaker providing the speech input. Such speaker-specific reference prosody information may be determined in any suitable manner, including by observing speech patterns of the speaker over time. In other embodiments, the reference prosody information may be generic to multiple speakers. Such generic reference prosody information may be generic to any suitable set of speakers, such as a category of speakers sharing any suitable characteristic(s). For example, reference prosody information may be determined for a category of speakers that are "Americans," or a category of speakers that are "men," or a category of speakers that are "men from the American South." When reference prosody information is identified for one or more sets of speakers, prosody information received in block 902 may be compared to reference prosody information for a set of speakers to which the speaker who provided the speech input belongs.

Comparison of prosody information to reference prosody information may be performed in any suitable manner. For example, the prosody information for the speech input received in block 902 may include phoneme duration information that indicates a length of time that the speaker used to pronounce phonemes included in the speech input. Reference prosody information may include reference phoneme duration information that identifies an expected pronunciation time for each phoneme. When the evaluation engine compares the prosody information, in some cases the evaluation engine may determine that the phoneme duration information for the speech input indicates that pronunciation times for some, most, or all of the phonemes included in the speech input is longer than the expected pronunciation times. When phoneme pronunciation times for one or more phonemes are longer than expected pronunciation times, the evaluation engine may determine that the speaker was speaking more slowly than expected. Because a speaker may speak more slowly or hesitate when the speaker is uncertain, the longer pronunciation times may be a sign of potential uncertainty in the speaker. The evaluation engine may therefore determine that the speaker was uncertain.

As another example of the manner in which duration information may be used to detect potential uncertainty, prosody information received in block 902 may include pause information identifying a length of one or more pauses in the speech input, such as pauses between words. Pauses may include filled pauses and/or unfilled pauses. Filled pauses may include sounds expressed in speech input such as a speaker stretching pronunciation of a word for the duration of the pause. A filled pause may be detected by an ASR system as both a word and as a pause. Unfilled pauses may include a length of time included in speech input for which the speaker did not speak a word, such as a length of time during speech input for which the speaker stayed silent or produced a hesitation vocalization. Reference prosody information may include information on lengths of normal pauses for speakers, such as information indicating the maximum or average length of a pause considered to be normal for a speaker who is not uncertain. The evaluation engine may compare pause information for the speech input to the reference pause information to determine whether one or more pauses in the speech input are longer than the pauses considered to be normal. When one or more pauses in the speech input are longer than normal, the evaluation engine may determine that the speaker was speaking slowly or hesitating, which may be a sign of potential uncertainty in the speaker.

As another example of the manner in which prosody information may be evaluated, the prosody information for the speech input received in block 902 may include pitch information indicating one or more pitches and/or more one more variations in pitch that were used to pronounce phonemes included in the speech input. Reference prosody information may include reference pitch information for the phonemes, such as expected pitches or variations in pitches for phonemes and/or unexpected pitches or variations in pitches that are indicative of potential uncertainty. The pitch information for the speech input may be compared to this reference pitch information to determine whether the pitch information for the speech input varies from what is expected or includes any of the unexpected pitches/variations. For example, a "vocal fry" is a common variation in pitch that may be considered to be a sign of potential uncertainty for some American speakers. Reference prosody information may identify a vocal fry as an unexpected variation in pitch that is indicative of potential uncertainty. When the evaluation engine compares pitch information for the speech input to the reference pitch information and the pitch information for the speech input is determined to include a vocal fry, the evaluation engine may determine that the speaker was uncertain. As another example, a speaker who is hesitating may speak with a pitch that is higher than that speaker's typical pitch. Prosody information generated by an ASR system based on the speech input may indicate that the speaker was speaking with a higher-than-normal pitch. Reference prosody information may indicate that such a higher pitch is a sign of potential uncertainty. When the evaluation engine compares the pitch information for the speech input to the reference pitch information, the evaluation engine may determine that, because the pitch used in the speech input was higher than normal for the speaker and the reference information indicates this is a sign of potential uncertainty, the evaluation engine may determine that the speaker was uncertain.

Speaker certainty may be detected based on factors other than duration of phonemes/pauses or pitch. In addition to or as an alternative to using longer phonemes, inserting longer pauses, or speaking with a nonstandard pitch, some speakers may utter hesitation vocalizations, such as "um" or "uh," when uncertain of speech input. Prosody information received in block 902 may include information on a number of hesitation vocalizations included in the speech input and detected by the ASR system. Because some ASR systems are adapted to remove hesitation vocalizations from the words included in recognition results when detected, these hesitation vocalizations may not be observable in words and/or phrases of recognition results received from ASR systems. The ASR system may, however, produce information regarding hesitation vocalizations that are detected in a recognition result during a recognition process and provide this hesitation vocalization information together with or as part of the prosody information.

In embodiments in which an evaluation engine evaluates hesitation vocalizations as part of evaluating speech input and compares information about hesitation vocalizations of speech input to reference hesitation vocalization information, any suitable reference information may be used. For example, reference hesitation vocalization information may include a maximum or average number of hesitation vocalizations included in speech input that is considered to be normal. As another example, reference hesitation vocalization information may include a maximum or average length of a hesitation vocalization included in speech input that is considered to be normal. The evaluation engine may compare a count or length of hesitation vocalizations included in speech input to a count or length of hesitation vocalizations indicated by the reference hesitation vocalization information to determine whether the count is higher than is considered normal or a length of a hesitation vocalization is higher than is considered normal. When the count of hesitation vocalizations or length of a hesitation vocalization included in the speech input is higher than is considered normal, the evaluation engine may determine that the speaker was hesitating when speaking the speech input, which may be a sign of potential uncertainty.

In embodiments that evaluate hesitation vocalizations, hesitation vocalization information and reference hesitation vocalization may be received and processed in any suitable manner. In some embodiments, information on hesitation vocalizations (e.g., counts of hesitation vocalizations) may be included in prosody information produced by an ASR system and received in block 902 and in reference prosody to which the prosody information is compared. In other embodiments, however, information on hesitation vocalizations may be stored as hesitation vocalization information separate from prosody information. In some such embodiments, hesitation vocalization information may be received from an ASR system in block 902 along with (but separate from) prosody information and may be compared to reference hesitation vocalization information. In embodiments that store and use hesitation vocalization information separate from prosody information, hesitation vocalization information (including reference hesitation vocalization information) may be produced in any suitable manner and may relate to any suitable one or more speakers, including in the manner discussed above in connection with prosody information.

In some embodiments, prosody information and/or hesitation vocalization information may include information generally relating to a speech input, such as information that may be used to determine whether the speech input includes any signs of potential uncertainty. For example, with respect to hesitation vocalizations, hesitation vocalization information may include a count of hesitation vocalizations identified by the ASR system in speech input. However, embodiments are not limited to operating with prosody information and/or hesitation vocalization information that only generally relates to a speech input. In other embodiments, prosody information and/or hesitation vocalization information may additionally or alternatively include information linking signs of potential uncertainty to particular words and/or phrases of one or more recognition results produced by an ASR system based on speech input. For example, with respect to hesitation vocalizations, the hesitation vocalization information may link one or more hesitation vocalizations to words and/or phrases that the ASR system detected at similar locations in the speech input as the hesitation vocalization(s). For example, the hesitation vocalization information may identify for a word of a recognition result that the word was recognized by the ASR system adjacent in the speech input to a hesitation vocalization detected by the ASR system. As another example, the hesitation vocalization information may identify for a phrase of a recognition result that a hesitation vocalization was detected by the ASR system to be adjacent to or in the middle of the phrase in the speech input. Prosody information may also include information linking signs of potential uncertainty to particular words and/or phrases of recognition results. For example, if an ASR system detects in speech input a pause adjacent to a word and/or phrase, prosody information for the speech input may identify that the pause is adjacent to that word/phrase appearing in the recognition result. Identifying words and/or phrases of recognition results that appear at similar locations in the speech input as signs of potential uncertainty may be useful in identifying particular words and/or phrases appearing in recognition results in which the speaker may have been uncertain. This is because the speaker may have produced these signs of potential uncertainty close in time to particular words and/or phrases of which the speaker is uncertain. As discussed below, the evaluation engine may use information identifying these particular words and/or phrases to determine whether to produce an alert regarding the words/phrases of recognition results.

Prosody information and/or hesitation vocalization information linking hesitation vocalization information to words and/or phrases of recognition results may be formatted in any suitable manner, as embodiments are not limited in this respect. In some embodiments, the information may be formatted as a preliminary recognition result produced by an ASR system during a recognition process that was not filtered to suppress information regarding hesitation vocalizations, information regarding pauses, or other information that may be used to identify signs of potential uncertainty. As discussed above, an ASR system may be configured to process preliminary results of a recognition process to suppress information that may be indicative of uncertainty when that information is detected by the ASR system, including by suppressing information regarding hesitation vocalizations or pauses. In some embodiments, however, such preliminary recognition results may be provided by the ASR system to the evaluation engine. Because the information that may be indicative of uncertainty was not suppressed by the ASR system and was received by the evaluation engine, this information may appear in the preliminary recognition result alongside words and/or phrases detected by the ASR system in the speech input. When the evaluation engine receives the preliminary recognition result in which this information has not been suppressed, the evaluation engine may review the preliminary recognition result and the information to identify the words and/or phrases that were detected by the ASR system as being at similar locations in the speech input as the information that may be indicative of uncertainty of the speaker. As discussed below, if the evaluation engine determines, based on these signs of uncertainty, that it is likely that the speaker was uncertain, the evaluation engine may raise an alert regarding these words and/or phrases.

In some embodiments, in addition to or as an alternative to determining uncertainty of a speaker based on signs of uncertainty identified from prosody and/or hesitation vocalization information for one speech input, the evaluation engine may determine uncertainty of a speaker based on signs of uncertainty identified from prosody and/or hesitation vocalization information for multiple speech inputs. For example, the evaluation engine may determine uncertainty based on an evaluation of prosody and/or hesitation vocalization information for multiple speech inputs received together in time (e.g., as parts of a single dictation session). Such an evaluation may be carried out by evaluating aggregated prosody and/or hesitation vocalization information for the speech inputs. For example, with respect to hesitation vocalizations, an evaluation engine may determine uncertainty of a speaker by comparing a count of hesitation vocalizations detected by the ASR system in multiple speech inputs to a count of a maximum or average number of hesitation vocalizations that is considered to be normal when included in speech input over a length of time (e.g., 30 seconds or one minute). When an evaluation engine determines that the count of hesitation vocalizations detected in the multiple speech inputs is higher than is considered to be normal, the evaluation engine may determine that the speaker was uncertain when speaking each of the multiple speech inputs.

When the evaluation engine evaluates one or more speech inputs using any one or more of these or any other suitable factors indicative of potential uncertainty in a speaker, the evaluation engine may calculate a likelihood of potential uncertainty of the speaker. The evaluation engine may calculate the likelihood in any suitable manner, as embodiments are not limited in this respect. For example, when only one factor is evaluated and a likelihood of uncertainty is determined based on that factor, this likelihood may be used as the likelihood of the speaker's uncertainty. Alternatively, the evaluation engine may calculate a likelihood of uncertainty in the speaker for each of multiple factors evaluated, and those likelihoods can be combined to produce an overall likelihood of uncertainty of the speaker. The likelihoods produced based on each factor may be based on the information that uses that factor that is evaluated by the evaluation engine. For example, when phoneme duration information is evaluated, the evaluation engine may use an amount of variation of the phoneme durations from expected phoneme durations to calculate a number indicating a likelihood of uncertainty in the speaker. As another example, when a count of hesitation vocalizations is evaluated, the evaluation engine may use a variation of the count of hesitation vocalizations from the normal count of hesitation vocalizations to calculate a number indicating likelihood of uncertainty in the speaker. Likelihoods based on each of the factors may then be combined in any suitable manner, including using a weighting function, to produce a likelihood of uncertainty of the speaker.

Once the likelihood of uncertainty of the speaker is calculated, the likelihood may be used in any suitable manner. For example, the likelihood may be used in determining whether to raise an alert to a reviewer regarding the recognition results that are based on the speech input. By raising an alert when the speaker was uncertain, a reviewer to which the alert is provided may be more likely to more closely review the recognition results based on the speech input and may be more likely to identify errors in the recognition results that may have been present in the speech input due to the speaker's uncertainty.

Accordingly, the process 900 continues in block 906 to determine whether the likelihood calculated in block 904 indicates whether the speaker was sufficiently uncertain for an alert to be generated. The evaluation engine may make this determination in any suitable manner, an example of which is using one or more thresholds. In the example of FIG. 9, in block 906, the evaluation engine compares the likelihood of uncertainty calculated in block 904 to a threshold likelihood to determine whether the calculated likelihood exceeds the threshold. If the calculated likelihood does not exceed the threshold, the speaker may be determined not to have been sufficiently likely to have been uncertain for an alert to be raised. If, however, the evaluation engine determines that the calculated likelihood exceeds the threshold, then the speaker may be determined to be sufficiently likely to have been uncertain for an alert to be raised. In block 908, therefore, the evaluation engine triggers an alert regarding the uncertainty and stores information identifying that the speaker may have been uncertain. The evaluation engine may trigger the alert in any suitable manner, including in the manner discussed above in connection with block 208 of FIG. 2. The evaluation engine may store any suitable information in block 908. The information may include, for example, the calculated likelihood of uncertainty and/or information identifying the detected prosody information and/or hesitation vocalization information, reference prosody and/or hesitation vocalization information on which the determination of uncertainty was based, and/or particular words and/or phrases of one or more recognition results of which the speaker was determined to be uncertain.

Once the alert has been triggered and the information stored in block 908, or if the speaker was determined in block 906 not to be sufficiently uncertain to trigger an alert, the process 900 ends. Information regarding detected uncertainty of the speaker may be used in any suitable manner following the process 900. In some embodiments, when a speaker is detected to have been potentially uncertain in speech input, an alert may be provided to a reviewer that is reviewing recognition results based on that speech input, as discussed below in connection with FIG. 10. In other embodiments, the information regarding potential uncertainty may be used to determine whether to trigger an alert when words and/or phrases of recognition results are evaluated using any of the exemplary techniques described above in connection with FIGS. 2-8. A process for weighting a likelihood of a word or phrase being a potential error based on consequences associated with it being an error was discussed above in connection with FIG. 5. In some embodiments, a similar weighting process may be carried out using information regarding potential uncertainty of a speaker. For example, a likelihood of a word or phrase appearing in a recognition result, or of a difference in meaning appearing in recognition results in error, may be weighted based at least in part on information indicating potential uncertainty of the speaker. By doing so, when the speaker is detected as being uncertain of the speech input, any potential errors or potential significant errors that are detected in recognition results may be more likely to trigger an alert and therefore be more likely to be carefully reviewed by a reviewer.

In embodiments that evaluate prosody and/or hesitation vocalization information to determine a likelihood of uncertainty of a speaker, the information that is evaluated may be received from any suitable source at any suitable time. In some embodiments, the information may be received from an ASR engine immediately following a speech recognition process conducted on speech input. In such embodiments, prosody and/or hesitation vocalization information may be evaluated as speech input is input by a speaker and analyzed by the ASR engine. In other embodiments, prosody and/or hesitation vocalization information for speech input may be evaluated at a later time, such as at a time following receipt of other speech input and following processing of that other speech input by the ASR system. For example, in some embodiments speech input may be received and processed by an ASR system and words and/or phrases of recognition results determined by the ASR system may be displayed via a user interface. A user (who may be a reviewer) may then edit the words and/or phrases in any suitable way (e.g., by providing additional speech input and/or by providing textual input via a keyboard). Once the words/phrases are edited, an evaluation of the words/phrases may be carried out to determine whether there are signs of potential uncertainty or other indications of potential errors. Such an evaluation may include evaluating prosody and/or hesitation vocalization information regarding the speech input that resulted in the words/phrases included following the editing. When the prosody and/or hesitation vocalization information is evaluated, the prosody and/or hesitation vocalization information may be information related to any suitable speech input that was provided at any suitable time to produce the words/phrases included following the editing. When edits are made to words and/or phrases of an original speech input, some words or phrases of the original speech input may be removed from recognition results. Prosody and/or hesitation vocalization information produced from the portions of the speech input relating to the removed words/phrases may therefore not be relevant to an analysis of the words and/or phrases included following the editing. Additionally, during the editing, new speech input may be provided by a speaker to include new words/phrases to replace words/phrases included in the original speech input. Prosody and/or hesitation vocalization information from the new speech input may therefore be relevant to the analysis of the words/phrases included following the editing. Accordingly, in some embodiments, when an evaluation of prosody and/or hesitation vocalization information is carried out, the information that is evaluated may be information produced from multiple different speech inputs received at different times that collectively resulted in the words/phrases included following the editing.

Techniques described herein may be used by an evaluation engine of a speech processing system to review one or more recognition results generated by an ASR system for a speech input to determine whether the recognition results include any of potential errors, including errors that may change a meaning of a recognition result in a semantically meaningful way. As mentioned above, some embodiments may identify potential errors to a reviewer (e.g., a human reviewer) so that the attention of the reviewer may be called to the recognition results that may include potential errors. The reviewer may then determine whether the recognition results in fact include an error and may take remedial action if desired.

Figure 10:
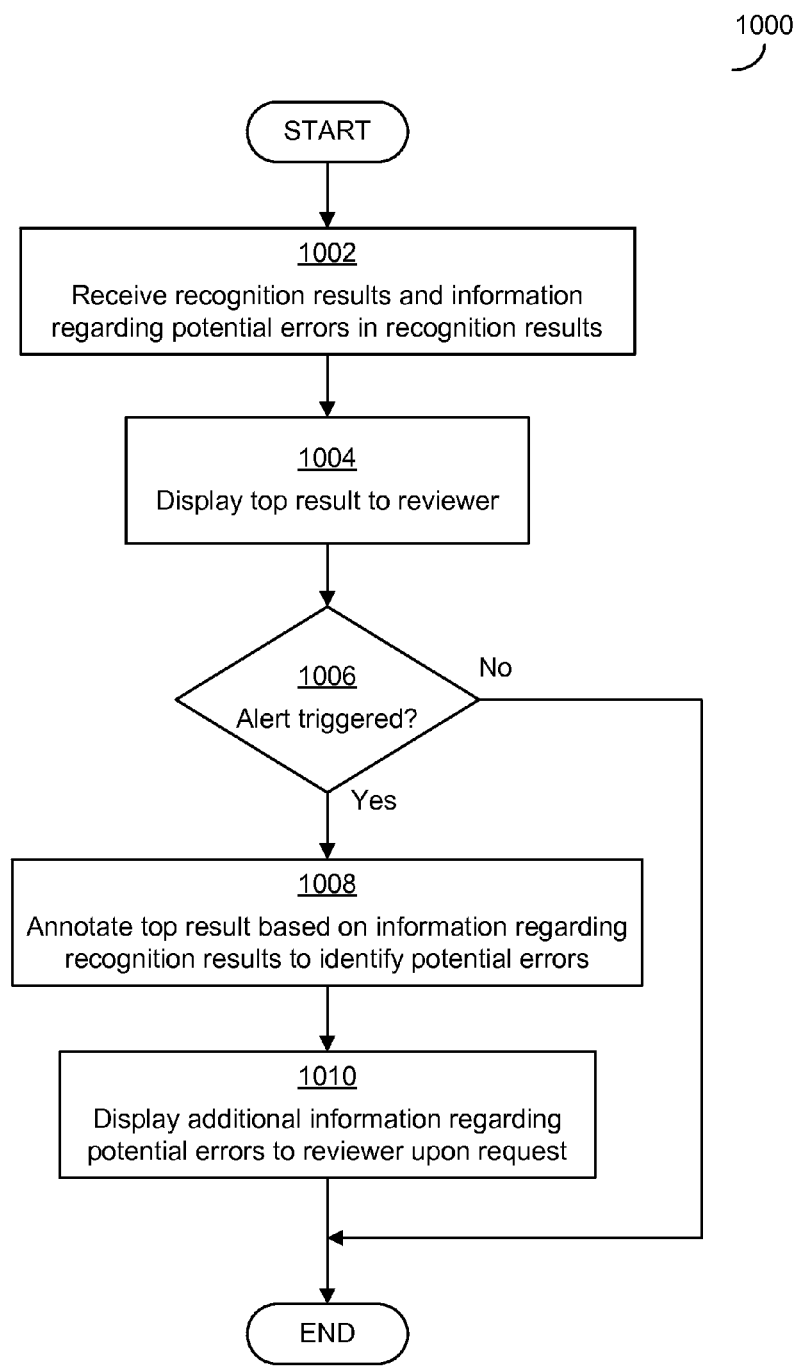
FIG. 10 is a flowchart of an exemplary process that may be carried out in some embodiments to display to a reviewer information regarding recognition results and potential significant errors.

FIG. 10 illustrates one process that may be used in some embodiments by a review engine to present information on potential errors identified by an evaluation engine to a reviewer during a review process. The process 1000 may be used by a review engine that displays recognition results to a reviewer for one or more speech inputs and that displays information regarding one or more potential errors identified in the recognition result(s) and/or potential errors or potential uncertainty identified in speech input on which the recognition result(s) is/are based. In some embodiments, multiple speech inputs and multiple potential errors may be evaluated together by the reviewer using the review engine. The speech input(s) for which the recognition results may be viewed together may be speech inputs that were received close together in time and/or that are grouped together in some other manner, such as by relating to a same topic and/or a same document. For example, when the speech inputs are a dictation of a document, a reviewer may view together the recognition results for all speech input of the dictation, such that the reviewer can view the complete document at one time and can, at one time, review the potential errors identified by an evaluation engine in the recognition results for the speech inputs of the document. In one review process, the recognition results for multiple speech inputs may be displayed along with annotations (e.g., flags) identifying locations of potential errors in the recognition results. A reviewer may review the recognition results and the annotations and, if the reviewer desires, view additional information about the potential errors, such as information produced and stored by evaluation techniques that an evaluation engine used to identify the potential errors.

The reviewer to which the recognition results and potential errors are displayed by the process 1000 may be any suitable entity capable of reviewing the recognition results. In some embodiments, the reviewer may be a person who provided the speech input for which the recognition results were produced (e.g., a physician dictating medical reports), while in other embodiments the reviewer may be a different person, such as a transcriptionist or other person who reviews recognition results but did not provide the speech input.

Prior to the start of the process 1000, an ASR system generates recognition results for one or more speech input and an evaluation engine evaluates those recognition results to determine whether there are any indications of potential errors that may be significant. When the evaluation engine identifies potential errors, the evaluation engine triggers an alert, and in some embodiments optionally stores information about the potential error and/or about the recognition results from which the evaluation engine determined there might be a potential error in the recognition results.

The process 1000 begins in block 1002, in which a review engine receives recognition results generated by an ASR system for a speech input and optionally receives information identifying potential errors determined by an evaluation engine. The one or more recognition results include a top result that the ASR system is most confident is a correct representation of the speech input, and may optionally also include one or more alternative recognition results.

In block 1004, the review engine presents, for each speech input, the top recognition result to the reviewer via a display. The top result may be presented in any suitable manner. For example, the top result can be presented so as to form a string of text of a document, such as where the speech inputs each form a portion of a dictation of a document.

In block 1006, the review engine determines whether an alert regarding a potential error in the recognition results was triggered by the evaluation engine. If an alert was triggered, then the review engine may notify the reviewer in some way that a potential error was detected in the recognition results. The reviewer may be notified in any suitable manner, including through a graphical and/or textual message displayed to the reviewer and/or an audible sound produced for the reviewer, or in any other way.

A reviewer may additionally or alternatively be notified regarding the potential error by an annotation made to the top result in block 1008. In block 1008, the review engine may annotate the top result based on the information received in block 1002 so as to identify to the reviewer potential errors that were detected by the evaluation engine. The annotations may be made in any suitable manner. In some embodiments, a display style of the top result may be altered in some way so as to identify a location of a potential error. For example, where the display of the top recognition result includes a text display of words of the top recognition result, a font style in the display of words and/or phrases that correspond to the potential errors identified by the evaluation engine may be altered. An altering of the font style may include changing a text color, a background color for the text, a font size, a font weight (e.g., bold or italic), or any other font property. As another example, a word or phrase that corresponds to a potential error may be annotated with a graphic, such as by placing near the word or phrase an icon indicating that the word or phrase is associated with a potential error. Any suitable icon may be used, including a stylized line placed under the word or phrase. Rather than (or in addition to) altering a display style of the top result, in some embodiments the top result may be annotated through the inclusion of information regarding alternative recognition results associated with the potential errors. For example, where a potential error was identified based on a difference between the top result and an alternative recognition result, near where the top result is displayed some content of the alternative recognition result may be displayed. The content of the alternative recognition result may be displayed in a different manner in some embodiments, such as in a different font style (e.g., different font color, different background color, different weight, etc.). For example, if a top result for a speech input is the phrase "there is evidence of active disease in the abdomen" and a potential error was identified based on the alternative recognition result "there is no evidence of active disease in the abdomen," the top result may be annotated by the inclusion in the display of the word "no" in a different font style between the "is" and "evidence" of the top result. This is merely one example as it should be appreciated that any suitable annotations may be used, as embodiments are not limited in this respect.

In some embodiments, annotations regarding potential errors identified for a word, phrase, sentence, paragraph, or other portion of a recognition result may be combined in the display to yield fewer annotations (e.g., a single annotation) for the portion of the recognition result. The annotations may be combined in any suitable way for any suitable reason. Combining the annotations may serve to limit the number of annotations that may be displayed to a reviewer, which may aid the reviewer in focusing on reviewing the identified potential errors and may prevent the reviewer from being overwhelmed by a large number of annotations and potential errors to review. For example, when an evaluation engine identifies many potential errors in recognition results for a sentence and the sentence is to be displayed for review, a review engine may display a single annotation for the sentence that identifies to the reviewer that the entire sentence is potentially erroneous and should be reviewed carefully. A reviewer may find the reviewing process easier when the reviewer need only focus on a few errors, and may therefore find the sentence easier to review when the entire sentence is annotated once, rather than the sentence being annotated multiple times for multiple potential errors.

After the top result has been annotated with the indication(s) of the potential error(s) in some embodiments, a reviewer may interact with the results in the display during the review process. In particular, the reviewer may interact with those results that have been annotated as being associated with potential errors and may request additional information regarding the potential errors. In block 1010, the review engine may respond to the reviewer's request(s) for information regarding potential errors with additional information regarding the potential error. Any suitable information regarding a potential error may be displayed. In some embodiments, for example, the additional information may include one or more alternative recognition results from which the potential error was identified. In other embodiments, the additional information may include one or more words of an alternative recognition result, rather than an entire recognition result. The additional information may also include information on the type of potential error identified, such as inconsistent meanings, differences in words, or words that were identified as unlikely to appear. Embodiments are not limited to displaying any particular type of additional information, and may display any suitable information that may aid a reviewer in determining whether the recognition results include an error, which may include any information that may aid the reviewer in correcting the error.

In some cases, a potential error may have been identified through multiple different evaluation techniques carried out on recognition results, such as being identified by a semantic interpretation process carried out by an evaluation facility and by a direct word comparison carried out by the evaluation facility. Each of the evaluation techniques may have produced and stored information about the potential error and this information may be presented to the reviewer as additional information about the potential error. When a potential error has been identified through multiple different techniques, any suitable additional information about the potential error may be displayed to the reviewer upon request. In some embodiments, information about the potential error produced by all of the multiple techniques by which the potential error was identified may be provided to the reviewer. In other embodiments, to limit the information provided to the reviewer so as not to overwhelm the reviewer, additional information about the potential error may be presented to the reviewer that was produced by only one or some of the evaluation techniques. For example, additional information may be presented that was produced by the evaluation technique that identified the potential error first in time. As another example, the review engine may be configured with a ranking of evaluation techniques and may select, from the multiple evaluation techniques that identified the potential error, the evaluation technique that is highest in the ranking, and additional information that was produced by the selected evaluation technique may be presented to the reviewer. Where such a ranking is used, the ranking of evaluation techniques may be produced based on any suitable criterion or criteria, including a developer's impressions of, or information about, reliability of the evaluation techniques. It should be appreciated that embodiments are not limited to making a selection between evaluation techniques or only displaying additional information produced by one or some evaluation techniques, and that embodiments that make a selection are not limited to making the selection in any particular manner.

Once the additional information has been presented to the reviewer, or if the review engine determines in block 1006 that no alert was triggered by the evaluation engine, the process 1000 ends. Following the process 1000 and after a reviewer reviews the recognition results and corrects potential errors, the recognition results may be finalized in any suitable way.

Various examples given above were discussed in connection with evaluating speech in a medical context, such as speech dictated by a clinician that describes a clinical encounter with a patient. Some of the examples were discussed in connection with a radiologist or other clinician discussing the results of a radiological examination of a patient. It should be appreciated, however, that embodiments are not limited to evaluating speech in a medical context or any other particular domain and that the techniques described herein may be used to evaluate speech in any suitable domain or domains.

The techniques described herein may be implemented in any suitable manner. Included in the discussion above are a series of flow charts showing the acts of various processes. These processes may be implemented as software integrated with and directing the operation of one or more single- or multi-purpose processors, may be implemented as hardware circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. It should also be appreciated that, unless otherwise indicated herein, the particular sequence of steps and/or acts described in each flow chart is merely illustrative, as the processes and techniques described herein can be implemented in other ways.

In some embodiments, the techniques described herein may be embodied in computer-executable instructions implemented as software, including as application software, system software, firmware, middleware, embedded code, microcode, or any other suitable type of computer code. Such computer-executable instructions may be written using any suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functionality facilities, each providing one or more operations to complete execution of algorithms operating according to these techniques. A "functionality facility," however instantiated, is a structural component of a computer system that, when integrated with and executed by one or more computers, causes the one or more computers to perform a specific operational role. Functionality facilities may include routines, programs, objects, components, data structures, etc. that perform particular tasks or implement particular abstract data types. The functionality of the functionality facilities may be combined or distributed as desired in the systems in which they operate. In some implementations, one or more functionality facilities carrying out techniques herein may together form a complete software package. These functionality facilities may, in alternative embodiments, be adapted to interact with other, unrelated functionality facilities and/or processes, to implement a software program application.

Some exemplary "engines" have been described herein for carrying out one or more tasks. In some embodiments, an engine may be implemented as one or more functionality facilities executing on one or more processors or able to execute on one or more processors. Embodiments that implement engines as one or more functionality facilities are not limited to being implemented in any specific number, division, or type of functionality facilities. In some embodiments, all functionality may be implemented in a single functionality facility.

Computer-executable instructions implementing the techniques described herein (when implemented as one or more functionality facilities or in any other manner) may, in some embodiments, be encoded on one or more computer-readable media to provide functionality to the media. Computer-readable media may include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 1106 of FIG. 11 described below (i.e., as a portion of a computing device 1100) or as a stand-alone, separate storage medium. As used herein, "computer-readable media" (also "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more computing device(s) operating in any suitable computer system, or one or more computing devices (or one or more processors of one or more computing devices) may be programmed to execute the computer-executable instructions. A computing device or processor may be programmed to execute instructions stored in any manner accessible to the computing device/processor. Functionality facilities that comprise these computer-executable instructions may be integrated with and direct the operation of a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more Field-Programmable Gate Arrays (FPGAs) for carrying out the techniques described herein, or any other suitable system. Accordingly, in some embodiments, techniques described herein may be implemented as systems executing on a distributed system of two or more computing devices. For example, an evaluation engine operating according to techniques described above may be executed by two or more computing devices.

Figure 11:
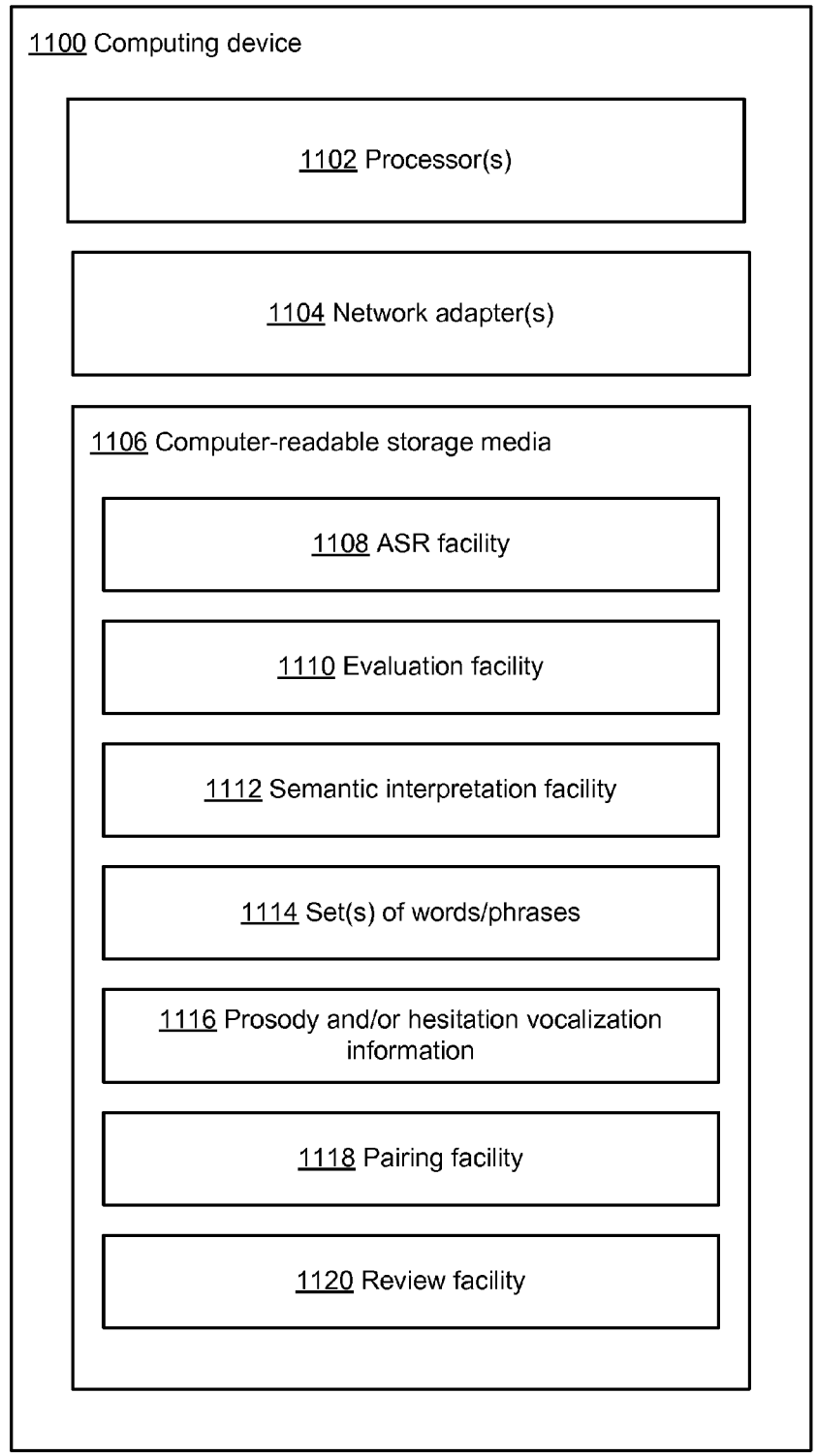
FIG. 11 is a block diagram of an exemplary computing device on which embodiments described herein may be implemented.

FIG. 11 illustrates one exemplary implementation of a computing device in the form of a computing device 1100 that may be used in a system implementing the techniques described herein, although others are possible. It should be appreciated that FIG. 11 is intended neither to be a depiction of necessary components for a computing device to operate in accordance with the principles described herein, nor a comprehensive depiction.

Computing device 1100 may comprise at least one processor 1102, a network adapter 1104, and computer-readable storage media 1106. Computing device 1100 may be, for example, a desktop or laptop personal computer, a personal digital assistant (PDA), a smart mobile phone, a server, or any other suitable computing device. Network adapter 1104 may be any suitable hardware and/or software to enable the computing device 1100 to communicate wired and/or wirelessly with any other suitable computing device over any suitable computing network. Computer-readable media 1106 may be adapted to store data to be processed and/or instructions to be executed by processor 1102.

The data and instructions stored on the one, two, or more computer-readable storage media 1106 may comprise computer-executable instructions implementing techniques described herein. In the example of FIG. 11, computer-readable storage media 1106 stores computer-executable instructions implementing various engines and storing various information as described above. Computer-readable storage media 1106 may store an ASR facility 1108 that, when executed on the processor(s) 1102, implements an ASR system for carrying out a speech recognition process on data regarding a speech input to generate one or more recognition results for the speech input. Computer-readable storage media 1106 may also store an evaluation facility 1110 that, when executed on the processor(s) 1102, implements an evaluation engine that carries out an evaluation of recognition results, using any of the exemplary techniques described herein. As part of evaluating the recognition results, in some embodiments an evaluation engine may interact with a semantic interpretation engine. In such embodiments, a semantic interpretation facility 1112 may be stored on the computer-readable storage media 1106. The semantic interpretation facility 1112, when executed by the processor(s) 1102, implements a semantic interpretation engine that carries out a semantic interpretation of one or more recognition results to determine facts expressed in the recognition results. Also, in embodiments where one or more sets of words and/or phrases are evaluated by an evaluation engine, sets of words/phrases 1114 may be stored on the computer-readable storage media 1106. The sets of words/phrases 1114 may include any of the sets of words discussed above. As should be appreciated from the above discussion of techniques that may be used by an evaluation engine, in some embodiments the evaluation engine may not use both a semantic interpretation engine and sets of words/phrases 1114. Accordingly, in some embodiments the computer-readable storage media 1106 may not store both the semantic interpretation facility 1112 and the sets of words/phrases 1114, but would store the one used by the evaluation engine 1112. Additionally, while the semantic interpretation facility 1112 is illustrated as separate from the evaluation facility 1110, in some embodiments the semantic interpretation facility 1112 may form a part of the evaluation facility 1110. The computer-readable storage media 1106 may further store, in some embodiments, prosody and/or hesitation vocalization information 1116. Prosody and/or hesitation vocalization information 1116 may include any suitable information regarding prosody and/or hesitation vocalizations. The information 1116 may include prosody and/or hesitation vocalization information produced by an ASR system based on speech input provided by a speaker and/or reference prosody and/or hesitation information that may be used by the evaluation facility 1110 in evaluating information produced by an ASR system. In some embodiments that store both prosody information and hesitation vocalization information, the prosody information may be stored together with hesitation vocalization information (e.g., stored in a single logical unit) or may be stored separately in any suitable manner. In some embodiments, the computer-readable storage media 1106 may additionally store a pairing facility 1118, which when executed by the processor(s) 1102 implements a pairing engine to carry out a process for automatically determining pairs of words to use in evaluating recognition results. Lastly, in some embodiments the computer-readable storage media 1106 may also store a review facility 1120 that, when executed by the processor(s) 1102, implements a review engine to carry out a review process for interacting with a reviewer to display recognition results and information regarding potential errors in the recognition results. While the example of FIG. 11 illustrates multiple facilities 1108, 1110, 1112, 1118, and 1120, embodiments are not limited to implementing all of these facilities or implementing all of these facilities together on one computing device. Rather, embodiments may implement any suitable facility or combination of facilities in any suitable system including one or more devices.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Accordingly, the foregoing description and drawings are by way of example only.

The invention claimed is:

1. A method of processing a top result of a recognition by an automatic speech recognition (ASR) system on a speech input, the ASR system producing a plurality of results comprising the top result and at least one alternative result of the recognition, the top result being identified by the ASR system as most likely of the plurality of results to be a correct recognition result for the speech input, the method comprising:
   determining whether the top result includes a member of a set of words or phrases, the set of words or phrases comprising a plurality of members and each member of the set comprising a word or phrase; and
   when it is determined that the top result includes a word or phrase of a first member of the set,
      producing a modified result by substituting a word or phrase of a second member of the set for the word or phrase of the first member in the top result,
      determining, using a language model related to a language and/or domain of the speech input, a likelihood of the modified result occurring in the language and/or domain,
      evaluating the likelihood of the modified result occurring in the language and/or the domain, and
      determining whether to trigger an alert based on a result of the evaluating.

2. The method of claim 1, wherein the determining the likelihood using the language model comprises determining the likelihood using a language model related to the medical domain.

3. The method of claim 1, wherein the determining whether to trigger an alert comprises weighting the likelihood produced by the language model based on information indicating a significance of consequence in the domain associated with misrecognizing the speech input as specifying the first member rather than the second member.

4. The method of claim 1, wherein the determining the likelihood of the modified result comprises determining the likelihood using a language model for the domain that produces a likelihood weighted using information indicating a significance of consequence in the domain associated with misrecognizing the speech input as specifying the first member rather than the second member.

5. The method of claim 1, wherein the determining whether to trigger an alert based on a result of the evaluating comprises:
  determining whether the likelihood of the modified result occurring is above a threshold; and
  when the likelihood is above the threshold, triggering the alert.

6. The method of claim 1, wherein the determining whether to trigger an alert based on a result of the evaluating comprises:
  comparing the likelihood of the modified result occurring to a likelihood of the top result occurring in the language and/or the domain; and
  determining whether to trigger the alert based at least in part on the comparison.

7. The method of claim 1, wherein:
  the determining whether the top result includes the member of the set comprises, when the member is a null word, determining that the top result includes the null word without evaluating words of the top result, and
  the producing the modified result by substituting the word or phrase of the second member comprises inserting the word or phrase of the second member into the top result.

8. The method of claim 1, wherein:
  a first member of the set is associated with a second member of the set with which the first member is acoustically-confusable and that, when substituted for the first member in a recognition result, changes a medical meaning of the recognition result.

9. The method of claim 1, further comprising, when it is determined that an alert should be triggered, triggering an alert identifying that a speaker from which the speech input was received may have misspoken.

10. At least one non-transitory computer-readable storage medium having encoded thereon computer-executable instructions that, when executed by at least one computer, cause the at least one computer to carry out a method of processing a top result of a recognition by an automatic speech recognition (ASR) system on a speech input, the ASR system producing a plurality of results comprising the top result and at least one alternative result of the recognition, the top result being identified by the ASR system as most likely of the plurality of results to be a correct recognition result for the speech input, the method comprising:
  determining whether the top result includes a member of a set of words or phrases, the set of words or phrases comprising a plurality of members and each member of the set comprising a word or phrase; and
  when it is determined that the top result includes a word or phrase of a first member of the set,
    producing a modified result by substituting a word or phrase of a second member of the set for the word or phrase of the first member in the top result,
    determining, using a language model related to a language and/or domain of the speech input, a likelihood of the modified result occurring in the language and/or domain,
    evaluating the likelihood of the modified result occurring in the language and/or the domain, and
    determining whether to trigger an alert based on a result of the evaluating.

11. The at least one computer-readable storage medium of claim 10, wherein the determining the likelihood using the language model comprises determining the likelihood using a language model related to the medical domain.

12. The at least one computer-readable storage medium of claim 10, wherein the determining whether to trigger an alert comprises weighting the likelihood produced by the language model based on information indicating a significance of consequence in the domain associated with misrecognizing the speech input as specifying the first member rather than the second member.

13. The at least one computer-readable storage medium of claim 10, wherein the determining whether to trigger an alert based on a result of the evaluating comprises:
  determining whether the likelihood of the modified result occurring is above a threshold; and
  when the likelihood is above the threshold, triggering the alert.

14. The at least one computer-readable storage medium of claim 10, wherein the method further comprises, when it is determined that an alert should be triggered, triggering an alert identifying that a speaker from which the speech input was received may have misspoken.

15. An apparatus comprising:
  at least one processor; and
  at least one storage medium having encoded thereon processor-executable instructions that, when executed by the at least one processor, cause the at least one processor to carry out a method of processing a top result of a recognition by an automatic speech recognition (ASR) system on a speech input, the ASR system producing a plurality of results comprising the top result and at least one alternative result of the recognition, the top result being identified by the ASR system as most likely of the plurality of results to be a correct recognition result for the speech input, the method comprising:
    determining whether the top result includes a member of a set of words or phrases, the set of words or phrases comprising a plurality of members and each member of the set comprising a word or phrase; and
    when it is determined that the top result includes a word or phrase of a first member of the set,
      producing a modified result by substituting a word or phrase of a second member of the set for the word or phrase of the first member in the top result,
      determining, using a language model related to a language and/or domain of the speech input, a likelihood of the modified result occurring in the language and/or domain,
      evaluating the likelihood of the modified result occurring in the language and/or the domain, and
      determining whether to trigger an alert based on a result of the evaluating.

16. The apparatus of claim 15, wherein the determining the likelihood using the language model comprises determining the likelihood using a language model related to the medical domain.

17. The apparatus of claim 15, wherein determining whether to trigger an alert comprises weighting the likelihood produced by the language model based on information indicating a significance of consequence in the domain associated with misrecognizing the speech input as specifying the first member rather than the second member.

18. The apparatus of claim 15, wherein determining whether to trigger an alert based on a result of the evaluating comprises:
  comparing the likelihood of the modified result occurring to a likelihood of the top result occurring in the language and/or the domain; and determining whether to trigger the alert based at least in part on the comparison.

19. The apparatus of claim 15, wherein the method further comprises, when it is determined that an alert should be triggered, triggering an alert identifying that a speaker from which the speech input was received may have misspoken.

20. The apparatus of claim 15, wherein the method further comprises, when it is determined that an alert should be triggered, triggering an alert identifying that the top result may include a potential error.

* * * * *